(12) United States Patent
McClung, III

(10) Patent No.: US 7,769,631 B2
(45) Date of Patent: *Aug. 3, 2010

(54) BUSINESS SYSTEMS WITH PRICE GUARANTEE AND DISPLAY

(76) Inventor: Guy L. McClung, III, PMB 347, 16690 Champion Forest Dr., Spring, TX (US) 77379-7023

( * ) Notice: Subject to any disclaimer, the term of this patent is extended or adjusted under 35 U.S.C. 154(b) by 1469 days.

This patent is subject to a terminal disclaimer.

(21) Appl. No.: 11/100,343

(22) Filed: Apr. 6, 2005

(65) Prior Publication Data

US 2006/0015403 A1    Jan. 19, 2006

Related U.S. Application Data

(63) Continuation-in-part of application No. 10/896,643, filed on Jul. 22, 2004, now abandoned, and a continuation-in-part of application No. 10/752,066, filed on Jan. 6, 2004, now abandoned, and a continuation-in-part of application No. 09/637,293, filed on Aug. 11, 2000, now abandoned, and a continuation-in-part of application No. 09/506,718, filed on Feb. 18, 2000, now abandoned, and a continuation-in-part of application No. 09/375,451, filed on Aug. 17, 1999, now Pat. No. 7,107,225.

(51) Int. Cl.
    *G06Q 30/00*    (2006.01)
(52) U.S. Cl. ................ 705/14.34; 705/14.1; 705/14.23; 705/14.39
(58) Field of Classification Search ................ 705/14.1, 705/14.23, 14.34, 14.39, 26, 27
    See application file for complete search history.

(56) References Cited

U.S. PATENT DOCUMENTS

| 4,750,119 A | 6/1988 | Cohen et al. ................ 364/401 |
| 4,941,090 A | 7/1990 | McCarthy .................... 364/405 |
| 5,056,019 A | 10/1991 | Schultz et al. .............. 364/405 |
| 5,117,355 A | 5/1992 | McCarthy .................... 364/405 |
| 5,128,752 A | 7/1992 | VonKohorn .................. 358/84 |
| 5,185,695 A | 2/1993 | Pruchnicki .................. 364/401 |
| 5,200,889 A | 4/1993 | Mori .......................... 364/401 |
| 5,202,826 A | 4/1993 | McCarthy .................... 364/405 |
| 5,237,507 A | 8/1993 | Chasek .................. 364/464.04 |
| 5,287,268 A | 2/1994 | McCarthy .................... 364/405 |

(Continued)

FOREIGN PATENT DOCUMENTS

GB    2 377 314    8/2003

OTHER PUBLICATIONS

Int'l Search Report, PCT/US00/22406, Dec. 13, 2000, PCT counterpart of U.S. Appl. No. 09/375,451.

(Continued)

*Primary Examiner*—Raquel Alvarez

(57) ABSTRACT

A method for guaranteeing a consumer a best price on an item purchased from a vendor in a consummated final first transaction, the method including, in certain aspects, including determining a refund due to insure that a consumer receives the benefit of a later better price, and displaying the refund amount, individually or publicly, and, in one particular aspect, displaying a total amount for a plurality of such refunds.

20 Claims, 8 Drawing Sheets

BUSINESS SYSTEM

```
means for guaranteeing a consumer a best price on an
item purchased from the vendor in a first transaction at a
first price
        means for recording the first price and
information identifying the consumer
        means for monitoring the sales price of the
item for a predetermined time period after the first
transaction.

means for noting any price lower than the first
price for the item during the predetermined time period,
        means for calculating a money-value difference
between the first price and said any price lower than the
first price
        means for refunding to the consumer an amount
equal to the money-value difference
```

U.S. PATENT DOCUMENTS

| | | | |
|---|---|---|---|
| 5,297,026 A | 3/1994 | Hoffman | 364/408 |
| 5,310,997 A | 5/1994 | Roach et al. | 235/375 |
| 5,341,505 A | 8/1994 | Whitehouse | 395/800 |
| 5,367,561 A | 11/1994 | Adler et al. | 379/93 |
| 5,434,394 A | 7/1995 | Roach et al. | 235/375 |
| 5,450,938 A | 9/1995 | Rademacher | 194/206 |
| 5,517,406 A | 5/1996 | Harris et al. | 364/408 |
| 5,642,279 A | 6/1997 | Bloomberg et al. | 395/214 |
| 5,664,115 A | 9/1997 | Fraser | 705/37 |
| 5,666,493 A | 9/1997 | Wojcik et al. | 705/26 |
| 5,689,100 A | 11/1997 | Carrithers et al. | 235/380 |
| 5,699,528 A | 12/1997 | Hogan | 395/240 |
| 5,729,693 A | 3/1998 | Holda-Flack | 395/214 |
| 5,740,549 A | 4/1998 | Reilly et al. | 705/14 |
| 5,748,908 A | 5/1998 | Yu | 395/244 |
| 5,761,648 A | 6/1998 | Golden et al. | 705/14 |
| 5,774,170 A | 6/1998 | Hite et al. | 348/9 |
| 5,781,894 A | 7/1998 | Petrecca et al. | 705/14 |
| 5,794,207 A | 8/1998 | Walker et al. | 705/23 |
| 5,806,044 A | 9/1998 | Powell | 705/14 |
| 5,809,242 A | 9/1998 | Shaw et al. | 395/200.47 |
| 5,832,457 A | 11/1998 | O'Brien et al. | 705/14 |
| 5,845,259 A | 12/1998 | West et al. | 705/14 |
| 5,845,265 A | 12/1998 | Woolston | 705/37 |
| 5,854,897 A | 12/1998 | Radziewicz et al. | 395/200.54 |
| 5,855,007 A | 12/1998 | Jovicic et al. | 705/14 |
| 5,857,175 A | 1/1999 | Day et al. | 705/14 |
| RE36,116 E | 2/1999 | McCarthy | 705/16 |
| 5,878,400 A | 3/1999 | Carter, III | 705/20 |
| 5,887,243 A | 3/1999 | Harvey et al. | 455/3.1 |
| 5,893,080 A | 4/1999 | McGurl et al. | 705/40 |
| 5,895,454 A | 4/1999 | Harrington | 705/26 |
| 5,907,830 A | 5/1999 | Engel et al. | 705/14 |
| 5,918,218 A | 6/1999 | Harris et al. | 705/37 |
| 5,933,593 A | 8/1999 | Arun et al. | 395/182.04 |
| 5,948,061 A | 9/1999 | Merriman et al. | 709/219 |
| 5,960,411 A | 9/1999 | Hartman et al. | 705/26 |
| 5,960,882 A | 10/1999 | Polivka | 166/297 |
| 5,970,480 A | 10/1999 | Kalina | 705/37 |
| 5,974,399 A | 10/1999 | Giuliani et al. | |
| 5,978,799 A | 11/1999 | Hirsch | 707/4 |
| 5,978,833 A | 11/1999 | Pashley et al. | 709/200 |
| 5,987,498 A | 11/1999 | Athing et al. | 709/203 |
| 5,987,508 A | 11/1999 | Agraharam et al. | 709/217 |
| 5,991,736 A | 11/1999 | Ferguson et al. | 705/14 |
| 5,991,738 A | 11/1999 | Ogram | 705/26 |
| 5,991,739 A | 11/1999 | Cupps et al. | 705/26 |
| 5,991,740 A | 11/1999 | Messer | 705/27 |
| 5,995,942 A | 11/1999 | Smith et al. | 705/14 |
| 5,995,948 A | 11/1999 | Whitford et al. | 705/41 |
| 5,999,907 A | 12/1999 | Donner | 705/1 |
| 5,999,914 A | 12/1999 | Blinn et al. | 705/26 |
| 5,999,915 A | 12/1999 | Nahan et al. | 705/27 |
| 5,999,917 A | 12/1999 | Facciani et al. | 705/36 |
| 5,999,919 A | 12/1999 | Jarecki et al. | 705/40 |
| 5,999,932 A | 12/1999 | Paul | 707/10 |
| 5,999,967 A | 12/1999 | Sundsted | 709/6 |
| 6,006,199 A | 12/1999 | Berlin et al. | 705/26 |
| 6,006,200 A | 12/1999 | Boies et al. | 705/26 |
| 6,006,205 A | 12/1999 | Loeb et al. | 705/34 |
| 6,009,408 A | 12/1999 | Buchanan | 705/11 |
| 6,009,409 A | 12/1999 | Adler et al. | 705/14 |
| 6,009,410 A | 12/1999 | LeMole et al. | 705/14 |
| 6,009,411 A | 12/1999 | Kepecs | 705/14 |
| 6,009,412 A | 12/1999 | Storey | 705/14 |
| 6,009,413 A | 12/1999 | Webber et al. | 705/26 |
| 6,009,415 A | 12/1999 | Shurling et al. | 705/35 |
| 6,014,634 A | 1/2000 | Scroggie et al. | 705/14 |
| 6,014,635 A | 1/2000 | Harris et al. | 705/14 |
| 6,014,636 A | 1/2000 | Reeder | 705/17 |
| 6,018,717 A | 1/2000 | Lee et al. | 705/13 |
| 6,018,718 A | 1/2000 | Walker et al. | 705/14 |
| 6,018,719 A | 1/2000 | Rogers et al. | 705/24 |
| 6,029,152 A | 2/2000 | Bublitz et al. | 705/40 |
| 6,035,280 A | 3/2000 | Christensen | 705/14 |
| 6,035,285 A | 3/2000 | Schlect et al. | 705/30 |
| 6,035,288 A | 3/2000 | Solomon | 705/37 |
| 6,035,289 A | 3/2000 | Chou et al. | 705/37 |
| 6,038,548 A | 3/2000 | Kamil | 705/35 |
| 6,041,309 A | 3/2000 | Laor | 705/14 |
| 6,049,778 A | 4/2000 | Walker et al. | 705/14 |
| 6,052,671 A | 4/2000 | Crooks et al. | 705/34 |
| 6,052,675 A | 4/2000 | Checchio | 705/44 |
| 6,058,373 A | 5/2000 | Blinn et al. | 705/26 |
| 6,070,150 A | 5/2000 | Remington et al. | 705/34 |
| 6,070,153 A | 5/2000 | Simpson | 705/36 |
| 6,076,068 A | 6/2000 | DeLapa et al. | 705/14 |
| 6,076,069 A | 6/2000 | Laor | 705/14 |
| 6,076,070 A | 6/2000 | Stack | 705/20 |
| 6,076,071 A | 6/2000 | Freeny, Jr. | 705/26 |
| 6,105,008 A | 8/2000 | Davis et al. | 705/41 |
| 6,249,772 B1 | 6/2001 | Walker et al. | |
| 6,269,343 B1 | 7/2001 | Pallakoff | |
| 6,450,407 B1 | 9/2002 | Freeman et al. | 235/492 |
| 6,662,166 B2 | 12/2003 | Pare et al. | |
| 7,120,591 B1 | 10/2006 | Solomon et al. | 705/14 |
| 7,222,084 B2 | 5/2007 | Archibald et al. | 705/10 |
| 2002/0161641 A1 | 10/2002 | Quinlan et al. | 705/14 |

OTHER PUBLICATIONS

U.S. Appl. No. 09/375,934.
"Luskins—Marketing Procedures"; Dialog file 16, No. 02276566; Annual Report, 1989.
How to Use ValuPage, Super Markets Online, Inc., Feb. 23, 1999.
AOL's Steve Case Brings Coupons to the Internet, New York Post, 1998.
Ultrafinder, Ultradata Systems, Inc., U.S. News & World Report, p. 85, Jun. 28, 1999.
What's New At Prio, Prio, Inc., 1999.
Prio-Home, Prio, inc., May 13, 1999.
Save Smart Software to Undertake Product Software, SaveSmart Software India, Oct. 5, 1999.
U.S. Official Gazette Patents—entries for U.S. Patents 5,913,210 and 5,913,211, Jun. 15, 1999.
U.S. Official Gazette Patents—entry for U.S. Patents 5,903,874, May 11, 1999.
U.S. Official Gazette Patents—entry for U.S. Patent 5,894,520, Apr. 13, 1999.
Info space.com To Acquire Saraide, Prio; Dec. 6, 1999.
Preferred Savings Card, Sears, Nov. 15, 1999.
Computer and Software News, V3, n12, p. 26, Mar. 25, 1985; "Murphy's Mart Uses Handleman for All Software", Abstract, Dialog file 275, No. 01115510.
Adweek New England Advertising Week, Aug. 23, 1993; "Tweeter Unveils Price Protection Program", Full Text, Dialog file 16, No. 04594933.
Seymour, Jim; "Corporate Buyers Deserve Price Protec-tion", PC Week, v8, n49, p. 69, Dec. 9, 1991; Dialog file 275, No. 01461988, Full Text article.
Freedman, Beth; "IBM makes moves to shore up dealer support", PC Week v3, n15, p. 148; Apr. 15, 1986 Dialog file 275, No. 01176015, Full Text article.
McConville, James A.; "New Beachheads"; HFD—The Weekly Home Furnishings Newspaper, V67, n39, p. 89, Sep. 27, 1993, Dialog file 148, No. 05519377, Full Text.
Halverson, Richard, "Tops Touts Subdued Attitude", Discount Store News, Oct. 16, 1995, p. 8 (2), v34, n20, Dialog file 148 # 08266121.
"Circuit City Stores—Marketing Procedures", 1989, p. 0, Dialog file 160 # 02282203.

"Compliance: No Exception for Government Contractors", Journal of Accountancy, Jun. 1992, p. 94-100, v173, n6, Dialog file 15 # 00618928.

"Montgomery Ward at its fighting weight", Minneapolis Star & Tribune, May 14, 1987, p. M:11, Dialog file 160 # 01625279.

"Office Depot: Office Depot Online Open for Business", Business/Retail Editors and Internet/On-Line Writers, Jan. 15, 1998, Dialog file 810 # 0795255.

International Search Report for PCT/US00/22406, PCT counterpart of U.S. Appl. 09/375,451, mailed Dec. 13, 2000.

International Preliminary Examination Report for PCT/US00/22406, completed Apr. 2, 2001.

Notice of Allowance for U.S. Appl. No. 11/518,552, mailed May 28, 2009.

BUSINESS SYSTEM

> means for recording the first price and information identifying the consumer,
>
> means for monitoring the sales price of the item for a predetermined time period after the first transaction,
>
> means for noting any price lower than the first price for the item during the predetermined time period,
>
> means for calculating a money-value difference between the first price and said any price lower than the first price, and
>
> means for refunding to the consumer an amount equal to the money-value difference

*Fig. 8*

> a host system that includes the means for recording, means for monitoring, means for noting, and means for
>
> OPTIONAL > means for duplicating for the consumer any incentive accompanying sales of the item after the first transaction during the predetermined time period
>
> OPTIONAL > means for determining a pertinent geographic area for the first transaction and for limiting the monitoring step to sales prices available within the pertinent geographic area
>
> OPTIONAL > means for providing a warranty to the consumer
>
> OPTIONAL

BUSINESS SYSTEM

> means for guaranteeing a consumer a best price on an item purchased from the vendor in a first transaction at a first price
>
> means for recording the first price and information identifying the consumer
>
> means for monitoring the sales price of the item for a predetermined time period after the first transaction.
>
> means for noting any price lower than the first price for the item during the predetermined time period,
>
> means for calculating a money-value difference between the first price and said any price lower than the first price
>
> means for refunding to the consumer an amount equal to the money-value difference

*Fig. 9*

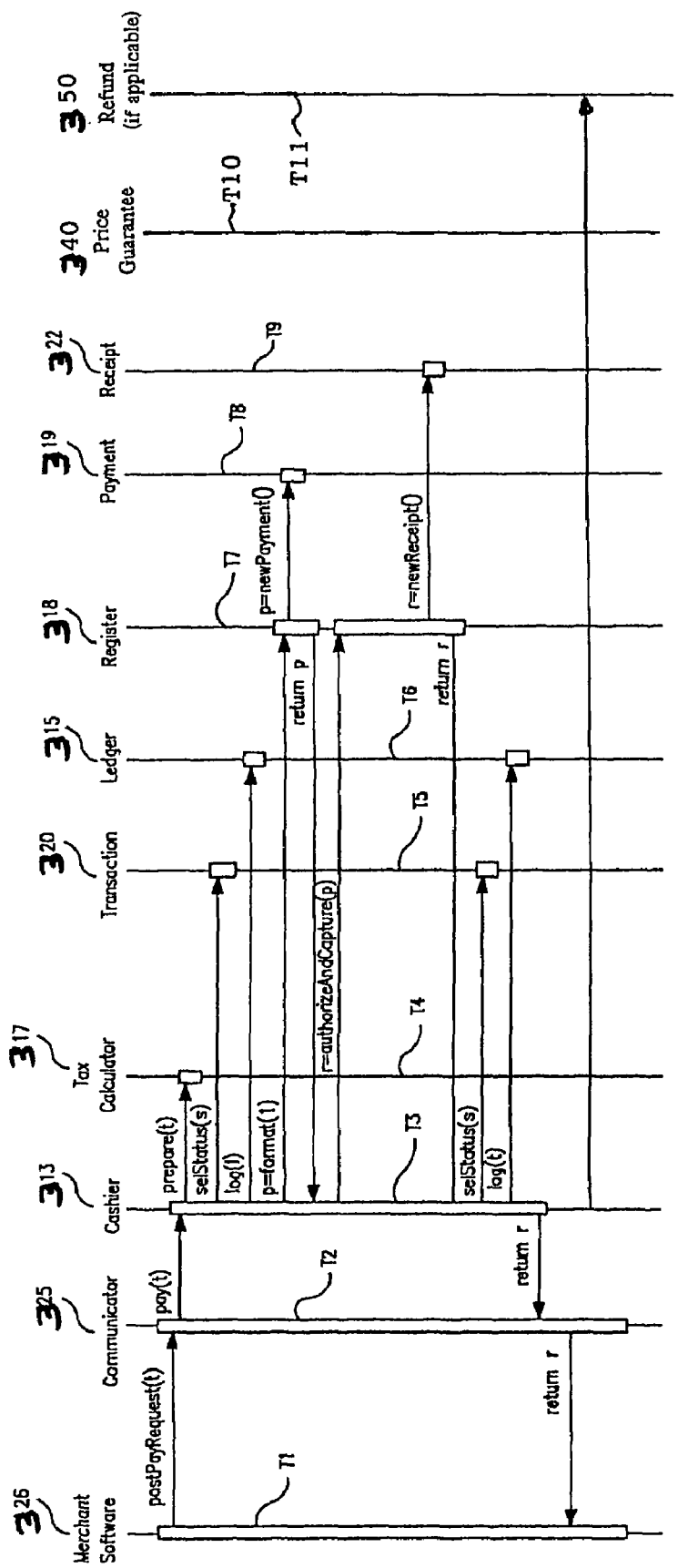
Fig. 10 Interaction Diagram of the Processing of a Payment Request

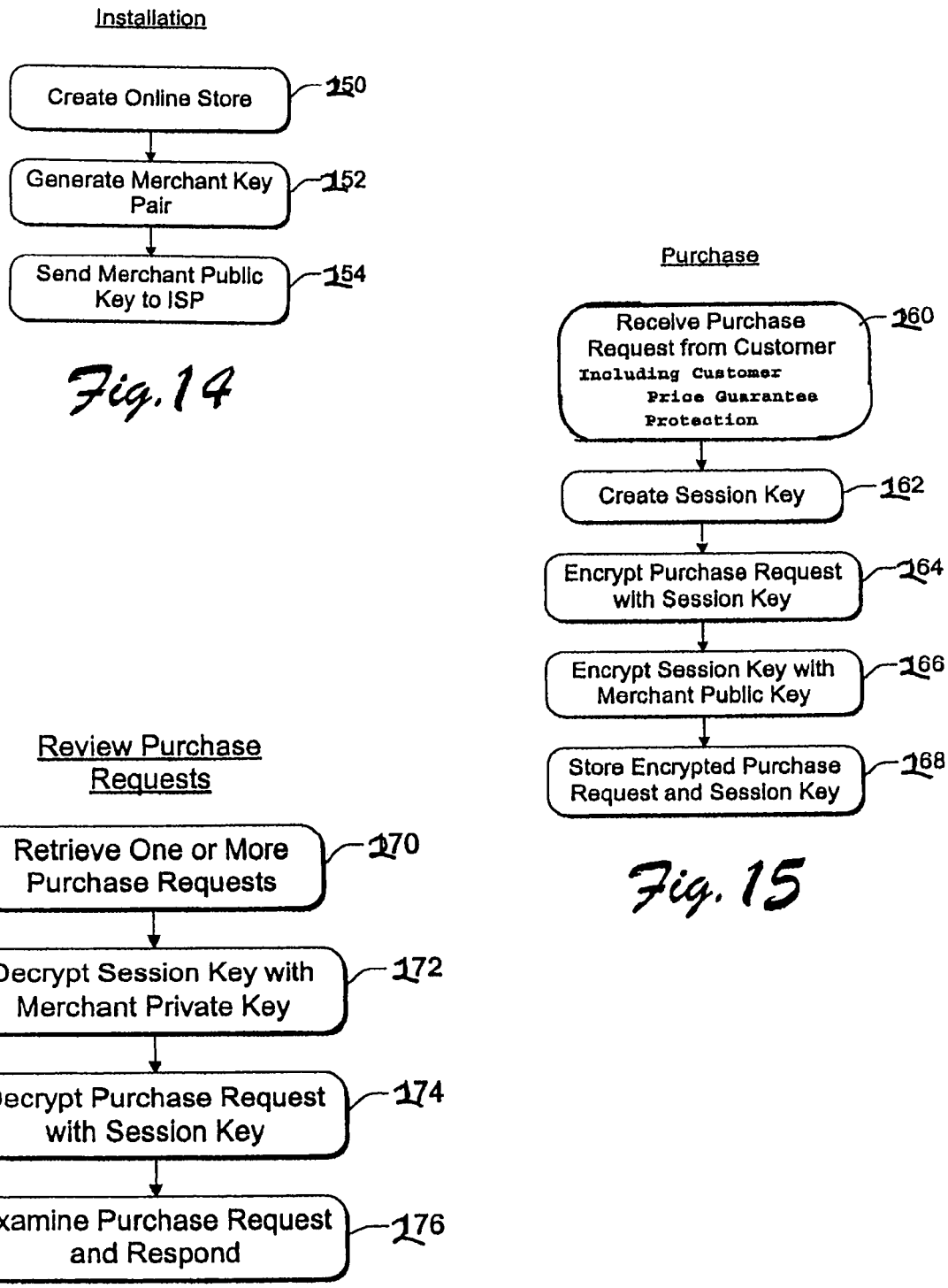

BUSINESS SYSTEMS WITH PRICE GUARANTEE AND DISPLAY

RELATED APPLICATIONS

This is a continuation-in-part of U.S. application Ser. No. 09/637,293 filed Aug. 11, 2000 now abandoned; Ser. No. 09/506,718 filed Feb. 18, 2000 now abandoned; and Ser. No. 09/375,451 filed Aug. 17, 1999 now U.S. Pat. No. 7,107,225; Ser. No. 10/752,066 filed Jan. 6, 2004 now abandoned; and Ser. No. 10/896,643 filed Jul. 22, 2004 now abandoned all incorporated fully herein for all purposes.

BACKGROUND OF THE INVENTION

1. Field of the Invention

This invention relates to improvements to business systems with which a customer can be in direct electronic communication with a vendor, e.g., via a system such as the Internet global communications system. In certain aspects, this invention relates to such systems that also provide guaranteed pricing for a predetermined time period so that a consumer is assured that an item purchased will not be sold in the near future at a discount or sale price which is not made available to the consumer.

2. Description of Related Art

The U.S. application Ser. No. 09/375,934 entitled "Business System" naming Sunil Thakur and Zulfiqar Momin as inventors filed on Aug. 17, 1999 is incorporated fully herein for all purposes including its discussion of Related Art.

There has long been a need, recognized by the present inventor, for a system that provides to a consumer the assurance that the consumer will not buy an item or service and then find out in the near future that the item or service was made available at a much lower price. There has long been a need for such a system usable with Internet business systems and network systems.

SUMMARY OF THE PRESENT INVENTION

The present invention, in certain aspects, provides a system that, in certain aspects, includes any of the systems and/or methods disclosed in the previously-mentioned "Business System" patent application—Ser. No. 09/375,934—additionally with the following: a method in which a vendor who sells a business or service to a consumer maintains a record of the sale and monitors that item (or service) for a preset time period (e.g., but not limited to, for a week, a month, three months, six months, or a year). In certain aspects, the consumer is automatically given a refund, a credit, and/or a coupon or certificate good for use equal to the difference in sales prices and/or including value for the new incentive. Alternatively, the vendor may make available a refund, etc. of lesser or of more value than the price difference. Alternatively, a host system or any centralized system as disclosed in the "Business System" patent application (or in any prior art system cited therein) may record the sale, monitor the vendor and the product (or service) for the preset time period, and handle the making available of the refund, etc. to the consumer. The subsequent price or prices to be compared to an initial first sales price can be limited to subsequent retain prices or it may include subsequent on-sale and/or discounted prices.

In other embodiments, the vendor (and/or host system or other system) monitors all vendors of such an item; monitors all vendors of such an item in a pertinent geographic area as defined in the "Business System" patent application; and/or monitors all providers of the item as identified by the manufacturer thereof. In certain aspects, the consumer is alerted to the fact that a refund is available or that a refund has been made by phone, by fax; and/or by email. In one embodiment, a consumer using a host system or similar system is automatically notified of such a refund, etc. upon logging on to the host system, e.g., but not limited to by a blinking icon or message such as "You've Got Refund$." In one aspect, when a consumer has an account with the vendor (or an account with the host system or similar system), the account is automatically credited with the refund amount. Such a blinking icon and/or message may also be used with the methods of the "Business System" patent application to alert a consumer to: a retirement account contribution (e.g. but not limited to "You've Got IRA$"; "You've Got Retirement $"; or simply "Retirement $"); an available coupon (e.g. but not limited to "You've Got Coupons"; "You've God Coupon $"; or simply "Coupons" or "Coupon $"); future rewards or future "bucks" (e.g. but not limited to "You've God Future rewards;" "You've Got Futurereward$"; "You've Got Futurebucks;" "You've Got Futurebuck$"; "Futurerewards"; "Futurereward$"; "Futurebucks"; "Futurebuck$"; "You've Got Discounts"; "You've Got Discount$"; "Discounts" or "Discount$".

In certain embodiments a price guaranteeing system according to the present invention can also monitor the vendor's competitors (in one aspect, in real time) and guarantee to a consumer that if any competitor offers a lower price (and/or new incentive), the consumer will get the benefit of the competitor's lower price. The consumer can be provided at the vendor's location any better price available then at any competitor for the same item (or service). In one aspect such a method includes making available presenting to the consumer any coupon, rebate, incentive etc. offered by a competitor. Such "incentive matching" can be limited, in certain embodiments, to a pertinent geographic area.

Any method and system according to the present invention may also be in communication with and part of any airline's frequent flyer mile program so that sales and refunds, etc. qualify for miles. To alert a consumer that miles have been earned related to a transaction, a blinking icon or message as described above may be used, e.g., but not limited to "Miles"; "You've Got Miles"; and "Mile$".

In one aspect a host system or similar system (e.g. but not limited to as in the "Business System" patent application and any prior art system disclosed therein) maintains a listing of vendor's that subscribe to and use the host system (or other system). When a consumer is afforded a refund, etc. based on a competitor's offerings, the host system can contact the competitor informing it that the competitor's offering was used as a refund basis and making available to the competitor a subscription for the host system.

In another aspect, whenever a consumer uses the host system or other system for any inquiry and/or transaction, the host system can contact any non-subscribing vendor that offers such a product or service and alert them to the fact that a sale was missed, then offer the non-subscribing vendor a subscription or sign-up agreement.

In other embodiments any system and method described herein may include the following (or any Internet system may use the following): when a consumer makes a purchase via the system, warranty information and/or warranty sign-up processing may be made available to the consumer by phone, by fax, by email, and/or via an interactive Internet site. A blinking icon or message as discussed above may be used to alert a consumer regarding warranties, e.g., but not limited to "Warranty!"; Warranties"; "Warranty$"; "You've Got Warranty"; or "You've Got Warranty$". The consumer can, via an interactive Internet site (e.g. of the host system, the vendor, other systems, and/or the manufacturer) provide the sales and product information to activate the warranty. Similarly, by phone, fax, email, and/or interactive Internet site, a consumer can be alerted to possible warranty extensions and/or renewals and can apply for them.

Any system according to the present invention can include displaying privately an individual's refund (e.g. visually or audially) and/or publicly (e.g. on a publicly viewable sign or screen), in one aspect with a real time running total of refunds provided).

DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or legally equivalent embodiments.

FIGS. 9 and 13 show exemplary computers useful with systems and methods according to the present invention.

FIGS. 14-16 are flow diagrams showing steps in a method according to the present invention.

FIGS. 8, 10 and 11 are schematic views of systems and/or methods according to the present invention.

DESCRIPTION OF EMBODIMENTS PREFERRED AT THE TIME OF FILING FOR THIS PATENT

Figure 1:
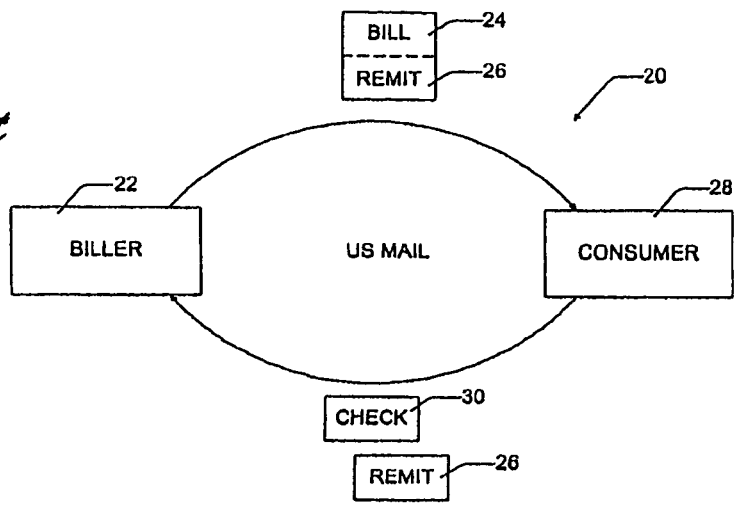
FIG. 1 is a diagrammatic illustration of a traditional prior art paper-based bill presentment and payment system.

The present invention, in certain preferred embodiments, provides a method for guaranteeing a consumer a best price on an item (or for a service) purchased from a vendor (either over a computer network or host system or at a vendor location) in a first transaction at a first price, the method including recording the first price (on paper, in an electronic chip, in a computer device, in a computer system or in computer memory) and information identifying the consumer, monitoring the sales price of the item for a predetermined time period after the first transaction, noting (either manually or electronically e.g. with a computer device) any price lower than the first price for the item during the predetermined time period, calculating (either manually, by calculator, electronically and/or by computer) a money-value difference between the first price and said any price lower than the first price, and refunding (in cash in hand paid; by crediting a consumer's account; by providing coupons or certificates; and/or by making the amount available to the consumer either on-line in a computer network or at a vendor location) to the consumer an amount equal to the money-value difference. The method can be done manually with paper records; on a suitably programmed computer and/or computer system or network; and/or via a host system or any other system, e.g. but not limited to as described in the "Business System" patent application or in any prior art system discussed therein.

In certain aspects, the guaranteed pricing is in effect for only one or two price changes. In other aspects, the guaranteed pricing is in effect throughout an entire preset time period and all lower prices will automatically be applied. The "any price lower than the first price" can be limited to any lower price offered by the particular vendor involved in the first transaction and/or can be limited to a lower price that becomes available in a pertinent geographic area. Alternatively, the "any lower price" can be based on a preset group of vendors including competitors of the vendor involved in the first transaction, all suppliers of the item (or service), e.g. but not limited to city-wide, state-wide, country-wide, or world-wide; and/or competitors who have signed up to be included in the base of price sources.

In certain aspects, methods as described above can include alerting a consumer regarding a refund based on a new lower price. Consumers can be alerted, e.g. by phone, fax, email, and/or via an interactive Internet site, e.g. but not limited to with a host system or other system (e.g. or in the "Business System" patent application and in any prior art system disclosed therein). Methods according to the present invention can also take into account new incentives to buy the item that was the subject of the first transaction (e.g. frequent flyer miles, discounts on other items or services, rebates, coupons for the same or other items or services in the future, cheaper or free warranties or extended warranties, etc.). A money-value is assigned to the new incentive and this is made available to the consumer and/or, if possible, the actual new incentive itself. The refunds, etc. and/or new incentives can be made available and/or paid for by a vendor, a host system or other similar system, a manufacturer, and/or a third party administrator of a host system.

The present invention, therefore, discloses in some, but not necessarily all embodiments, a business system for guaranteeing a consumer a best price on an item purchased from a vendor in a first transaction at a first price, the system as shown in FIG. 8 including means for recording the first price and information identifying the consumer, means for monitoring the sales price of the item for a predetermined time period after the first transaction, means for noting any price lower than the first price for the item during the predetermined time period, means for calculating a money-value difference between the first price and said any price lower than the first price, and means for refunding to the consumer an amount equal to the money-value difference; and, optionally, a host system that includes the means for recording, means for monitoring, means for noting, and means for calculating; means for duplicating for the consumer any incentive accompanying sales of the item after the first transaction during the predetermined time period; means for determining a pertinent geographic area for the first transaction and for limiting the monitoring step to sales prices available within the pertinent geographic area; and/or means for providing a warranty to the consumer.

The present invention, therefore, discloses in some, but not necessarily all embodiments, a business system with a magnetic strip card with consumer identifying information encoded thereon said information identifying a consumer desiring to conduct a transaction with a vendor, a host system that maintains information about discounts from said vendor, an apparatus for reading information on the magnetic strip card, said apparatus interconnected with and in communication with the host system, and means for applying any applicable discount related to said transaction for the benefit of said consumer, improvements as shown in FIG. 9 including means for guaranteeing a consumer a best price on an item purchased from the vendor in a first transaction at a first price, said means further including means for recording the first price and information identifying the consumer, means for monitoring the sales price of the item for a predetermined time period after the first transaction, means for noting any price lower than the first price for the item during the predetermined time period, means for calculating a money-value difference between the first price and said any price lower than the first price, and means for refunding to the consumer an amount equal to the money-value difference.

The present invention therefore, in certain embodiments, provides improvements for a method for generating vendor information including contacting a host system by a consumer, identifying a pertinent geographic area of interest to the consumer, identifying at least one vendor doing business in the pertinent geographic area, retrieving from the host system information related to the at least one vendor, and displaying said information for the consumer; and in one aspect such a method includes automatically displaying and/or downloading to a computer the information to the consumer—the improvements including providing a method to guarantee to the consumer a better price or a best price on items or services purchased from the vendor for a predetermined time period following a transaction.

The present invention therefore, in certain embodiments, provides improvements for a method for a vendor to provide a future discount to a customer of the vendor, the method including noting a transaction amount indicative of value of a transaction between the customer and the vendor, based on the transaction amount, calculating a discount amount to be applied to a future transaction between the customer and the vendor, storing the discount amount for future use, and informing the customer of the discount amount; and such a method including applying the discount amount to a future transaction of the customer—the improvements including providing a method to guarantee to the consumer a better price or a best price on items or services purchased from the vendor for a predetermined time period following a transaction.

The present invention therefore, in certain embodiments, provides improvements for a method for making a contribution to a retirement account of a customer of a vendor, the method including noting a transaction amount indicative of value of a transaction between the customer and the vendor, based on the transaction amount, calculating a contribution amount to be made to a retirement account of the customer, and making a contribution to the customer's retirement account in the amount of the contribution amount; and such a method wherein the vendor, the customer, a third party administrator and/or a host system make the contribution to the retirement account—the improvements including providing a method to guarantee to the consumer a better price or a best price on items or services purchased from the vendor for a predetermined time period following a transaction.

The present invention therefore, in certain embodiments, provides improvements for a method for generating a coupon including contacting a host system by a consumer, identifying a pertinent geographic area of interest to the consumer, identifying at least one vendor doing business in the pertinent geographic area, retrieving from the host system information related to the at least one vendor and at least one coupon currently provided by the at least one vendor, and generating a coupon corresponding to the at least one coupon—the improvements including providing a method to guarantee to the consumer a better price or a best price on items or services purchased from the vendor for a predetermined time period following a transaction.

It is within the scope of certain preferred embodiments of the present invention to provide a method (and a corresponding system and/or apparatus) which is an improved version of the subject matter of these U.S. Pat. No. 6,018,717, Jan. 25, 2000; U.S. Pat. No. 6,014,634, Jan. 11, 2000; U.S. Pat. No. 6,014,635, Jan. 11, 2000; U.S. Pat. No. 6,014,636, Dec. 21, 1999; U.S. Pat. No. 6,006,205, Dec. 21, 1999; U.S. Pat. No. 6,009,408, Dec. 28, 1999; U.S. Pat. No. 6,009,411, Dec. 28, 1999; U.S. Pat. No. 6,009,413, Dec. 28, 1999; U.S. Pat. No. 5,995,942, Nov. 30, 1999; U.S. Pat. No. 5,999,919, Dec. 7, 1999; U.S. Pat. No. 5,999,914, Dec. 7, 1999; U.S. Pat. No. 5,991,739, Nov. 23, 1999; U.S. Pat. No. 5,895,454, Apr. 20, 1999; U.S. Pat. No. 5,960,411, Sep. 28, 1999; U.S. Pat. No. 5,991,738, Nov. 23, 1999; U.S. Pat. No. 5,857,175, Jan. 5, 1999; U.S. Pat. No. 5,794,207, Aug. 11, 1998; U.S. Pat. No. 6,052,671 issued Apr. 18, 2000; U.S. Pat. No. 6,038,548 issued Mar. 14, 2000; and U.S. Pat. No. 6,070,150 issued May 30, 2000 (collectively the "listed patents")—(all of which listed patents are incorporated herein in the entirety for all purposes) said preferred embodiments according to the present invention including any method in any of these listed patents plus one or some (in any number and in any possible combination) of the elements of the present invention, including, but not limited to, one or some of these elements of certain embodiments of the present invention:

- guaranteeing a consumer a best price on an item or service purchased from a vendor in a first transaction at a first price
- recording the first price and information identifying the consumer
- monitoring sales prices of the item or service for a predetermined time period after the first transaction; the monitoring of sales prices including, but not limited to, monitoring regular prices, discount prices, on-sale prices, and clearance prices
- noting any sales price of the item or service lower than the first price during the predetermined time period
- calculating a money-value difference between the first price and said any price lower than the first price
- refunding to the consumer an amount equal to the money-value difference
- recording the first price and information identifying the consumer, monitoring the sales price of the item or service for a predetermined time period after the first transaction, noting any price lower than the first price for the item or service during the predetermined time period, calculating a money-value difference between the first price and said any price lower than the first price, and refunding to the consumer an amount equal to the money-value difference
- wherein the item or service is purchased by the consumer at a location of the vendor.
- wherein the item or service is purchased by the consumer on-line via a network system
- wherein the item or service is purchased via a host system and the host system records the first price and information identifying the customer; the host system conducts the monitoring, noting, and calculating steps; and the host system provides the refund to the consumer
- wherein the host system provides the refund by crediting an account of the consumer
- wherein the account is an account of the consumer with the host system wherein a refund is made for each subsequent sales price lower than the first price wherein the consumer conducts the first transaction with the vendor via the host system monitoring sales of the item or service during the predetermined time period for any incentive provided to consumers purchasing the item or service following the first transaction, and providing the consumer involved in the first transaction with a refund based on a money value of said incentive monitoring sales of the item or service during the predetermined time period for any incentive provided to consumers purchasing the item or service following the first transaction, and providing the consumer involved in the first transaction with a refund based on a money value with said incentive wherein only prices for the item or service to be sold by the vendor involved in the first transaction are taken into account in the noting step wherein only prices for the item or service for sale in a pertinent geographic area are taken into account in the noting step wherein a display is provided of refund(s), individual or totalled, public or private It is within the scope of the present invention to provide a system that includes any system from the listed patents with one or some (in any possible combination) of the following:

system for guaranteeing a consumer a best price on an item or service purchased from a vendor in a first transaction at a first price, the system including apparatus, computers, machines and/or devices for recording the first price and information identifying the consumer, for monitoring the sales price of the item for a predetermined time period after the first transaction, for noting any price lower than the first price for the item during the predetermined time period, for calculating a money-value difference between the first price and said any price lower than the first price, and for refunding to the consumer an amount equal to the money-value difference a host system that includes the apparatus, etc. for recording, for monitoring, for noting, and for calculating.

the host system also including the apparatus, etc. for refunding for duplicating for the consumer any incentive accompanying sales of the item after the first transaction during the predetermined time period for determining a pertinent geographic area for the first transaction and for limiting the monitoring step to sales prices available within the pertinent geographic area for providing a warranty to the consumer.

for alerting the consumer to possible warranties, warranty extensions, and/or warranty renewals, and/or for the consumer to apply for such a warranty, warranty extension, and/or warranty renewal Improved Versions of U.S. Pat. No. 6,014,634

The present invention, in certain aspects provides improved versions of the subject matter of U.S. Pat. No. 6,014,634, (incorporated fully here for all purposes) including, but not limited to: including for each method of the patent guaranteeing a best price according to the present invention; a computer implemented method for determining purchasing incentives for consumers, including the steps of: storing in a purchase history database product data for products purchased in association with a unique identifier, transmitting a prompt for personal information from a main computer to a personal computer over a computer network, transmitting personal information data from said personal computer to said main computer over said computer network in response to said prompt, said personal information data including an identity code, generating page data defining a personal web page that is accessible over said computer network, said personal web page based at least in part on said personal information data transmitted from said personal computer to said main computer, assigning a web page address to said personal web page based upon said personal information data, storing said page data defining said personal web page in a personal page database, determining a purchase incentive depending on (1) said product data stored in said purchase history database or (2) said page data stored in said personal page database, updating said page data so that said personal web page will display said purchase incentive guaranteeing a best price according to the present invention for the purchased products and, in one aspect, effecting such guaranteeing by recording the first price and information identifying the consumer monitoring sales prices of the item or service for a predetermined time period after the first transaction noting any sales price of the item or service lower than the first price during the predetermined time period calculating a money-value difference between the first price and said any price lower than the first price refunding to the consumer an amount equal to the money-value difference;

Improved Versions of U.S. Pat. No. 6,014,635

The present invention, in certain aspects, provides improved versions of the subject matter of U.S. Pat. No. 6,014,635 (incorporated fully here for all purposes) including, but not limited to: a method for providing a discount for a credit transaction, for use in a discount credit network comprising a plurality of transaction card issuers each having a plurality of participants holding a transaction card account issued by the card issuer, the method including assigning each participant a membership number wherein the membership number is associated with the particular participant's transaction card account, providing a computerized discount authorization processor operatively connected to the discount credit network including (1) a database containing the membership numbers and their associated transaction card accounts, and (2) processing means for correlating the membership numbers to their associated transaction card accounts and transaction card issuers, presenting, by the participant, the membership number to an authorized merchant for a transaction, issuing a first discount authorization request from said authorized merchant through the discount credit network to the discount authorization processor, wherein the first discount authorization request includes transaction data comprising the particular participant's membership number and an amount for the transaction, correlating the membership number to its associated transaction card account and transaction card issuer, issuing a second discount authorization request to the transaction card issuer associated with the transaction card account through the credit network, the second discount authorization request comprising the particular participant's transaction card account and the amount of the transaction, receiving, by the discount authorization processor, an authorization response signal from the transaction card issuer, said signal indicating a response to the proposed transaction, forwarding the authorization response signal to the authorized merchant, and for each item or service which is the subject of any of said transactions guaranteeing a best price according to the present invention for said item or service, and, in certain aspects, guaranteeing the best price by recording the first price and information identifying the consumer, monitoring sales prices of the item or service for a predetermined time period after the first transaction, noting any sales price of the item or service lower than the first price during the predetermined time period, calculating a money-value difference between the first price and said any price lower than the first price, refunding to the consumer an amount equal to the money-value difference.

Improved Versions of U.S. Pat. No. 6,014,636

The present invention, in certain aspects, provides improved versions of the subject matter of U.S. Pat. No. 6,014,636 (incorporated fully here for all purposes) including, but not limited to: including in each method of U.S. Pat. No. 6,014,636 guaranteeing a best price according to the present invention for the item or service that is the subject of the customer payment and including in each apparatus or system of U.S. Pat. No. 6,014,636 the apparatus(es), computer(s), network(s), device(s), machine(s), and/or computer program(s) for accomplishing the steps associated with guaranteeing the best price.

Improved Versions of U.S. Pat. No. 6,006,199

The present invention, in certain aspects, provides improved versions of the subject matter of U.S. Pat. No. 6,006,199 (incorporated fully here for all purposes) including, but not limited to: including in each method of U.S. Pat. No. 6,006,199 guaranteeing a best price according to the present invention and in each system of the patent the apparatus(es), computer(s), network(s), device(s), machine(s), and/or computer program(s) for accomplishing the guaranteeing of the best price.

Improved Versions of U.S. Pat. No. 6,006,205

The present invention, in certain aspects, provides improved versions of the subject matter of U.S. Pat. No. 6,006,205 (incorporated fully here for all purposes) including, but not limited to: including in each method of U.S. Pat. No. 6,006,205 guaranteeing a best price according to the present invention and in each system or device of the patent the apparatus(es), computer(s), network(s), device(s), machine(s), and/or computer program(s) for accomplishing the guaranteeing of the best price, and in certain aspects, the processor operative with the program to accomplish the steps of guaranteeing the best price.

Improved Versions of U.S. Pat. No. 6,009,408

The present invention, in certain aspects, provides improved versions of the subject matter of U.S. Pat. No. 6,009,408 (incorporated fully here for all purposes) including, but not limited to: including in each method of U.S. Pat. No. 6,009,408 guaranteeing a best price according to the present invention for any or all transactions and in each system of the patent the apparatus (es), computer(s), network(s), device(s), machine(s), and/or computer program(s) for accomplishing the guaranteeing of the best price for any or all transactions.

Improved Versions of U.S. Pat. No. 6,009,411

The present invention, in certain aspects, provides improved versions of the subject matter of U.S. Pat. No. 6,009,411 (incorporated fully here for all purposes) including, but not limited to: including in each method of U.S. Pat. No. 6,009,411 guaranteeing a best price according to the present invention for any or all purchased items and in each system of the patent the apparatus (es), computer(s), network(s), device(s), machine(s), and/or computer program(s) for accomplishing the guaranteeing of the best price.

Improved Versions of U.S. Pat. No. 6,009,413

The present invention, in certain aspects, provides improved versions of the subject matter of U.S. Pat. No. 6,009,413 (incorporated fully here for all purposes) including, but not limited to: including in each method of U.S. Pat. No. 6,009,413 guaranteeing a best price according to the present invention for any purchased product and in each system of the patent the apparatus(es), computer(s), network(s), device(s), machine(s), and/or computer program(s) for accomplishing the guaranteeing of the best price.

Improved Versions of U.S. Pat. No. 5,995,942

The present invention, in certain aspects, provides improved versions of the subject matter of U.S. Pat. No. 5,995,942 (incorporated fully here for all purposes) including, but not limited to: including in each method of U.S. Pat. No. 5,995,942 guaranteeing a best price according to the present invention and in each system of the patent the apparatus(es), computer(s), network(s), device(s), machine(s), and/or computer program(s) for accomplishing the guaranteeing of the best price.

Improved Versions of U.S. Pat. No. 5,999,919

The present invention, in certain aspects, provides improved versions of the subject matter of U.S. Pat. No. 5,999,919 (incorporated fully here for all purposes) including, but not limited to: including in each method of U.S. Pat. No. 5,999,919 guaranteeing a best price according to the present invention for any item or service which is the subject of a transaction and in each system of the patent the apparatus(es), computer(s), network(s), device(s), machine(s), and/or computer program(s) for accomplishing the guaranteeing of the best price.

Improved Versions of U.S. Pat. No. 5,999,914

The present invention, in certain aspects, provides improved versions of the subject matter of U.S. Pat. No. 5,999,914 (incorporated fully here for all purposes) including, but not limited to: including in each method of U.S. Pat. No. 5,999,914 guaranteeing a best price according to the present invention for the subject of an order and in each system of the patent the apparatus(es), computer(s), network(s), device(s), machine(s), and/or computer program(s) for accomplishing the guaranteeing of the best price.

Improved Versions of U.S. Pat. No. 5,991,739

The present invention, in certain aspects, provides improved versions of the subject matter of U.S. Pat. No. 5,991,739 (incorporated fully here for all purposes) including, but not limited to: including in each method of U.S. patent guaranteeing a best price according to the present invention and in each apparatus or system of the patent the apparatus(es), computer(s), network(s), device(s), machine(s), and/or computer program(s) for accomplishing the guaranteeing of the best price.

Improved Versions of U.S. Pat. No. 5,895,454

The present invention, in certain aspects, provides improved versions of the subject matter of U.S. Pat. No. 5,895,454 (incorporated fully here for all purposes) including, but not limited to: including in each method of U.S. Pat. No. 5,895,454 guaranteeing a best price according to the present invention for any product or service purchased and in each system of the patent the apparatus (es), computer(s), network(s), device(s), machine(s), and/or computer program(s) for accomplishing the guaranteeing of the best price.

Improved Versions of U.S. Pat. No. 5,960,411

The present invention, in certain aspects, provides improved versions of the subject matter of U.S. Pat. No. 5,960,411 (incorporated fully here for all purposes) including, but not limited to: including in each method of U.S. patent guaranteeing a best price according to the present invention for any item purchased and in each system of the patent the apparatus(es), computer(s), network(s), device(s), machine(s), and/or computer program(s) for accomplishing the guaranteeing of the best price.

Improved Versions of U.S. Pat. No. 5,991,738

The present invention, in certain aspects, provides improved versions of the subject matter of U.S. Pat. No. 5,991,738 (incorporated fully here for all purposes) including, but not limited to: including in each method of U.S. Pat. No. 5,991,738 guaranteeing a best price according to the present invention for any item or service purchased and in each system of the patent the apparatus (es), computer(s), network(s), device(s), machine(s), and/or computer program(s) for accomplishing the guaranteeing of the best price.

Improved Versions of U.S. Pat. No. 5,794,207

The present invention, in certain aspects, provides improved versions of the subject matter of U.S. Pat. No. 5,794,207 (incorporated fully here for all purposes) including, but not limited to: including in each method of U.S. Pat. No. 5,794,207 guaranteeing a best price according to the present invention for any item or service purchased, and in each system of the patent the apparatus(es), computer(s), network(s), device(s), machine(s), and/or computer program(s) for accomplishing the guaranteeing of the best price.

Improved Versions of U.S. Pat. No. 6,018,717

The present invention, in certain aspects, provides improved versions of the subject matter of U.S. Pat. No. 6,018,717 (incorporated fully here for all purposes) including, but not limited to: including in each method of U.S. Pat. No. 6,018,717 guaranteeing a best price according to the present invention for any item or service purchased, and in each system of the patent the apparatus(es), computer(s), network(s), device(s), machine(s), and/or computer program(s) for accomplishing the guaranteeing of the best price.

In one particular aspect of the present invention, a method is provided for guaranteeing the best price for the delivery of a mail item (e.g. a letter, parcel, package, box, postcard). Any method disclosed herein for guaranteeing a best price for a service may be used to guarantee a best price for mail delivery service.

Improved Versions of U.S. Pat. No. 6,038,548

The present invention, in certain aspects, provides improved versions of the subject matter of U.S. Pat. No. 6,038,548 (incorporated fully here for all purposes) including, but not limited to: including in each method of U.S. Pat. No. 6,038,548 guaranteeing a best price according to the present invention for a transaction (e.g. with transaction subject matter including any item or service purchased), and in each network, method, system and/or article of manufacture of the patent the apparatus(es), computer(s), network(s), device(s), machine(s), computer programming code, and/or computer program(s) for accomplishing the guaranteeing of the best price. In one particular aspect, a method according to the present invention is a method for implementation with a computer network that includes a plurality of user workstations coupled to a network server containing a collection of replaceable and extensible object-oriented software components that interoperate to provide back-end services, the method for conducting electronic commerce between a user and an electronic commerce merchant and including the steps of: a) generating an implementation of an abstract, object-oriented Cashier Component to process payment requests by employing a number of replaceable software components or tools in a framework; b) generating an implementation of an abstract, object-oriented CashierDesk component that provides the Cashier component access to instances of other classes used in processing a transaction; c) entering a transaction into the Cashier component for processing for payment and issuing of a receipt for the transaction using the CashierDesk components; and d) guaranteeing a best price to the user for the transaction. Such a method is illustrated diagrammatically in FIG. 10 (all items of which, except lines 140 and 150, are described in U.S. Pat. No. 6,038,548, incorporated here by reference; herein a numeral "3" prefix is added to each numeral from U.S. Pat. No. 6,038,548, e.g. component 113 here is component 13 in U.S. Pat. No. 6,038,548). Numeral 140 indicates the monitoring of subsequent prices at a time or times T10 for the transaction's subject matter, etc., according to the present invention to guarantee a best price to the user for the transaction. Numeral 150 indicates a refund at a time T11 if such is necessitated by the best price guarantee. An arrow from the "Cashier 113" indicates that in this particular embodiment the Cashier component 113 includes computer programming code and apparatus for conducting the various steps to effect the best price guarantee; but it is within the scope of this invention for them to be in any appropriate computer and/or accessible via a network, e.g. the Internet.

Improved Versions of U.S. Pat. No. 6,052,671

Figure 11:
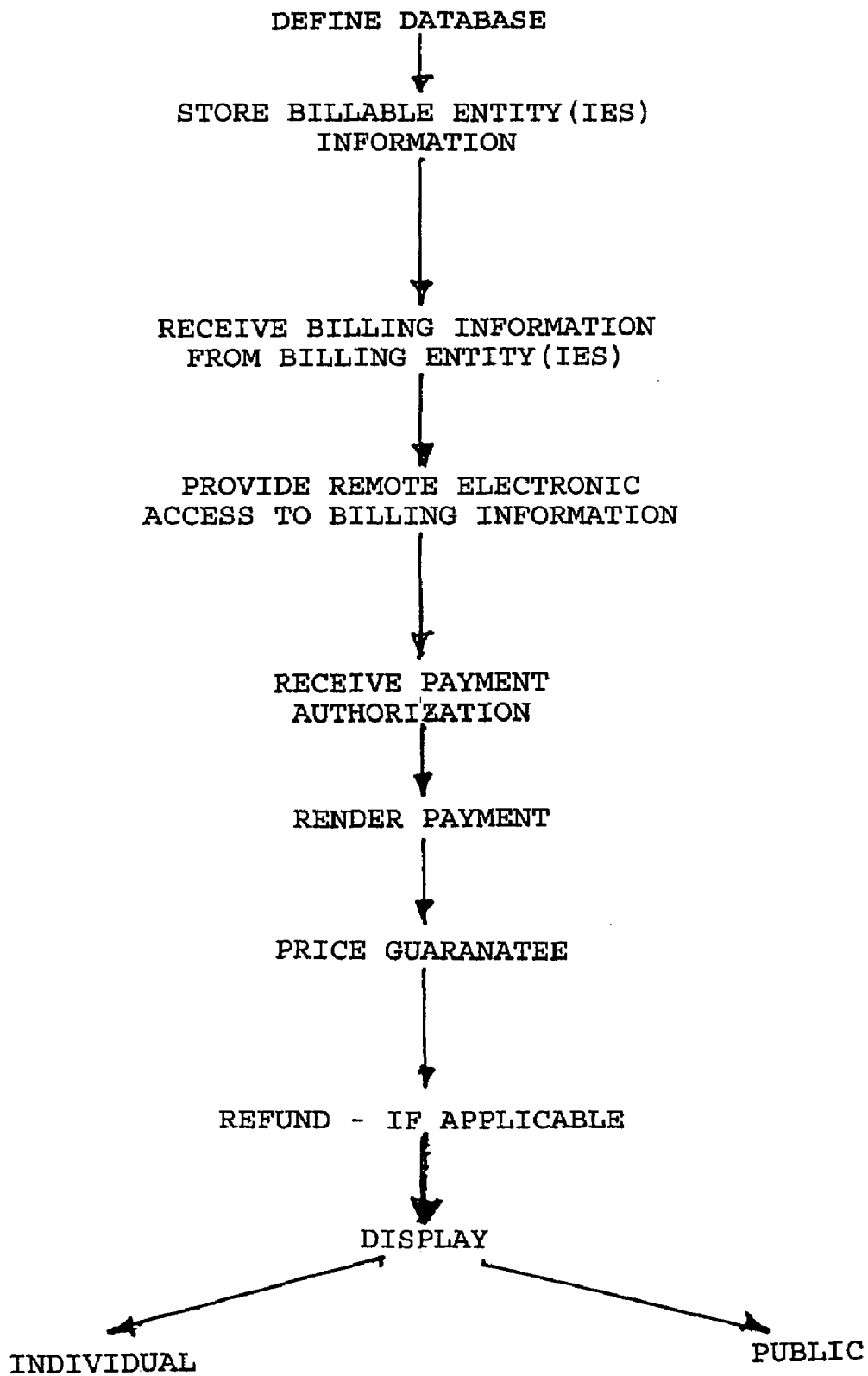

The present invention, in certain aspects, provides improved versions of the subject matter of U.S. Pat. No. 6,052,671 (incorporated fully here for all purposes) including, but not limited to: including in each method of U.S. Pat. No. 6,052,671 guaranteeing a best price according to the present invention for any item or service purchased, and in each system of the patent the apparatus (es), computer(s), network(s), device(s), machine(s), and/or computer program(s) for accomplishing the guaranteeing of the best price. In one particular aspect, a method according to the present invention is a method as shown schematically in FIG. 4 that is a billing and payment authorization method. All the boxes of FIG. 11 are described in U.S. Pat. No. 6,052,671 which is incorporated here by reference, except the bottom two boxes.

FIG. 11 illustrates an optional addition to the method illustrated in FIG. 11 and an addition that may be made to any method according to the present invention. Following provision of a price refund under a method according to the present invention, the entity providing the price refund may provide a display of that price refund to the individual who received it (e.g. in an email to the individual's email address) and/or by phone call to the individual's phone. The entity providing the price refund may also publicize the refund, with or without identifying the individual receiving the refund, e.g. on an electronic sign, screen, scoreboard or billboard. In one aspect such a public display displays an individual refund and/or a total amount for all refunds provided by the entity. In one particular aspect the public display includes a running amount in real time that is increased as a processing system provides information to the public display so that an ever-increasing total refund amount provided by the entity is publicized. The DISPLAY (FIG. 11) may be any suitable known sign, projection apparatus, hologram apparatus, scoreboard, panel, screen, device, or billboard used for displaying information including, but not limited to, screen apparatuses, panel apparatus, light apparatuses, LCD apparatuses, and back-lit apparatuses.

Improved Versions of U.S. Pat. No. 6,070,150

The present invention, in certain aspects, provides improved versions of the subject matter of U.S. Pat. No. 6,070,150 (incorporated fully here for all purposes) including, but not limited to: including in each method of U.S. Pat. No. 6,070,150 guaranteeing a best price according to the present invention for any item or service purchased, and in each system of the patent the apparatus (es), computer(s), network(s), device(s), machine(s), and/or computer program(s) for accomplishing the guaranteeing of the best price.

The term "consumer" is used here to represent both a typical person consuming goods and services as well as a business consuming goods and services. FIG. 1 shows a traditional prior art paper-based bill presentment and remittance system 20. At the end of a billing cycle, a biller 22 generates a bill 24 for each consumer account having a positive or negative account balance, or transactions in the billing cycle which yielded a zero balance. As used herein, a "biller" is any party that originates bills or statements for goods or services rendered to the consumer. Examples of billers are: utilities, government, merchants, and intermediate billing services such as banks.

In addition to the bill, the biller 22 creates remittance information 26 which associates the bill and any payment toward the bill with the consumer account. The remittance information 26 usually includes an account number, an account balance, an amount due, the date due, and any additional data that the biller might need to link the payment to the account. The remittance information 26 is typically in the form of a detachable stub or coupon which the consumer is requested to detach from the bill statement and return along with the payment.

The biller 22 prints the bill 24 and remittance information 26 on a paper statement, encloses the statement in an envelope, and mails the envelope to a consumer 28 using the U.S. postal service. The phase concerning preparation and mailing of the bill is referred to as the "bill presentment" phase.

To pay the bill, the consumer 28 usually writes a check 30 which directs payment to the biller 22. The payment may partially or fully satisfy the amount due in the bill. The consumer 28 also fills out payment information on the remittance stub 26, such as amount paid, payment date, and account number (if not already on the stub). The consumer 28 encloses the stub 26 and check 30 in an envelope (often, pre-addressed) and mails it back to the biller using, once again, the U.S. postal service.

Figure 2:
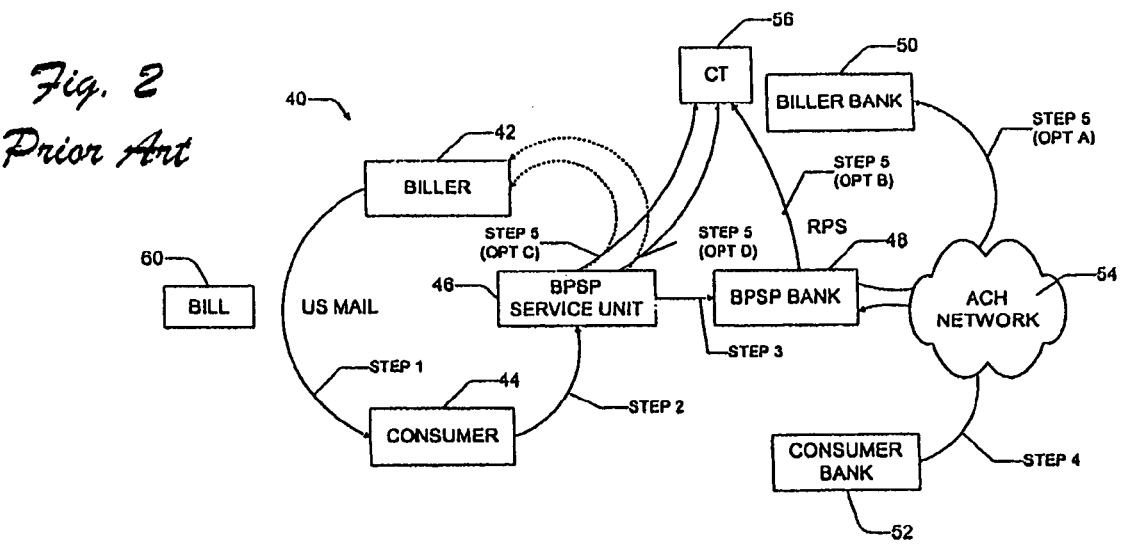
FIG. 2 is a diagrammatic illustration of a prior art electronic bill payment systems operated by companies like CheckFree Corporation.

FIG. 2 shows a prior art electronic Bill Payment Service Provider (BPSP) system 40 operated by companies like CheckFree Corporation, Intuit Services Corporation, and VISA Interactive. The BPSP system 40 includes a biller 42, a consumer 44, a BPSP services unit (BSU) 46, BPSP bank 48, a biller bank 50, a consumer bank 52, and ACH (Automated Clearing House) network 54, and potentially other payment networks like RPS (Remittance Processing Service). The lockbox operation of processing payment remittances is performed by either the biller, or a third party designated by the biller. In the illustrated implementation, a third party concentrator (CT) 56 processes payment remittances, although the bank 50 itself may also be designated to perform the lockbox operation. The ACH network is a nationwide system that processes electronic payments on behalf of depository financial institutions well-known in the art.

The methods for presenting and paying bills via existing BPSP systems 40 is illustrated as a series of enumerated steps. The biller 42 sends a paper bill 60 through the US mail to the consumer 44 (step 1). To pay the bill 60, the consumer 44 sends payment instructions to the BPSP services unit 46 by computer, or by telephone using an interactive voice response system (step 2). At this point, the BPSP services unit 46 has several choices:

Laser Draft. Print a laser demand check drawn on the consumer's account at the consumer bank 52 and send the laser demand check to the biller 42 or concentrator 56. This process is illustrated as step 5, option D.

Partial Electronic. With this choice, the consumer account is debited via the ACH network 54 (step 4), but payment is remitted using a check—either a bunch of payments lumped together as a check and list (step 5, Option C) or a single payment drawn on the BPSP bank account for the amount the consumer owes the biller (step 5, Option D).

Full Electronic. The consumer account is debited via the ACH network 54 (step 4) and payment is made via the ACH network (Step 5, Option A) or other network, such as the RPS network (step 5, Option B).

U.S. Pat. No. 5,383,113 to Kight et al., which is assigned to CheckFree Corporation, describes a system and method for determining which of the three choices to make for different situations.

Assuming that a choice for partial or full electronic payment is made, the BPSP services unit 46 prepares ACH-ready and other payment instructions to its bank 48 (step 3). Using the ACH instructions, an ACH debit transaction from the consumer bank account 52 is performed through the ACH network 54 (step 4). This ACH debit transaction effectively moves the authorized finds from the consumer bank account 52 to the BPSP bank 48.

At this point, a number of different options can be taken to transfer payment from the BPSP bank 48 to the biller bank 50 or the concentrator 56. One possibility is to perform an ACH credit transaction through the ACH network 54 from the BPSP account at bank 48 to the biller bank account 50 (step 5—option A). Another possibility is to perform an RPS credit transfer from the BPSP account at bank 48 to the biller bank account 50 or concentrator 56 (step 5—option B). A third option is for the BPSP bank 48 to produce a single aggregated check drawn on the BPSP account and a list of all consumers making payments, and to send the check and list to the biller 42 or concentrator 56 (step 5—option C).

Figure 3:
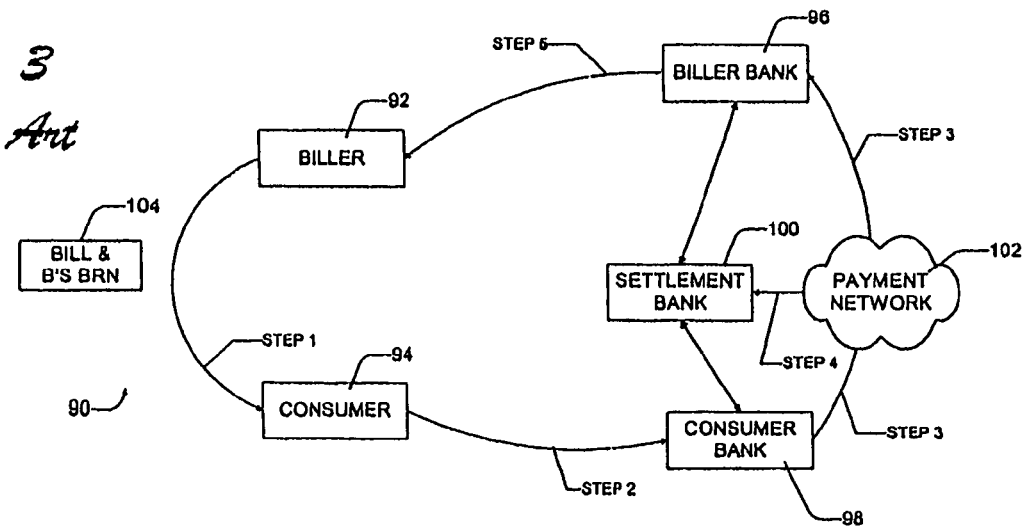
FIG. 3 is a diagrammatic illustration of a prior art electronic bill payment system proposed by Visa International.

FIG. 3 shows a prior art electronic bill payment system 90 proposed by Visa International. This system 90 is described in U.S. Pat. No. 5,465,206, entitled "Electronic Bill Pay System" issued Nov. 7, 1995. The Visa system 90 includes a biller 92, a consumer 94, a biller bank 96, a consumer bank 98, a settlement bank 100, and a payment network 102. The payment network 102 is described in the patent as being the VisaNet.RTM. network. A method for presenting and paying bills using the Visa bill pay system 90 is illustrated as a series of enumerated steps. The biller 92 sends a bill 104 by U.S. mail or email (step 1). The bill 104 includes a unique biller reference number (BRN). To pay the bill 104, the consumer 94 transmits to consumer bank 98 a transaction indicating an amount to pay, the source of funds, a date on which to make the payment, the consumer's account number with biller, and the biller's BRN (step 2).

The consumer bank 98 submits an electronic payment message to biller bank 96 via the payment network 102 (step 3). The payment message includes a bank identification number for consumer bank 98, a bank identification number for biller bank 96, the biller's BRN, the consumer's account number with biller, an amount to be paid, and an implicit guarantee of consumer bank 98 to provide funds to cover payment.

Settlement is achieved using the standard processes over the payment network, and particularly, via the VisaNet.RTM. network for Visa sponsoring banks and the RPS network for non-Visa sponsoring banks (step 4). After settlement, the biller bank 96 passes an accounts receivable (A/R) file to the biller 92 to indicate which payments were received by the biller bank on behalf of the biller (step 5). The A/R file lists individual payments received in correlation to the consumer accounts numbers. The remittance information flows from the consumer 94 directly to the consumer bank 98, then over a highly structured payment network 102 having strict rules as to format, content, timing, and so forth, and then onto the biller bank 96. As a result, the biller bank 96 only receives the data supported by the VisaNet.RTM. network, and is thus restricted to only this data for inclusion in the A/R file to be downloaded to the biller.

Figure 4:
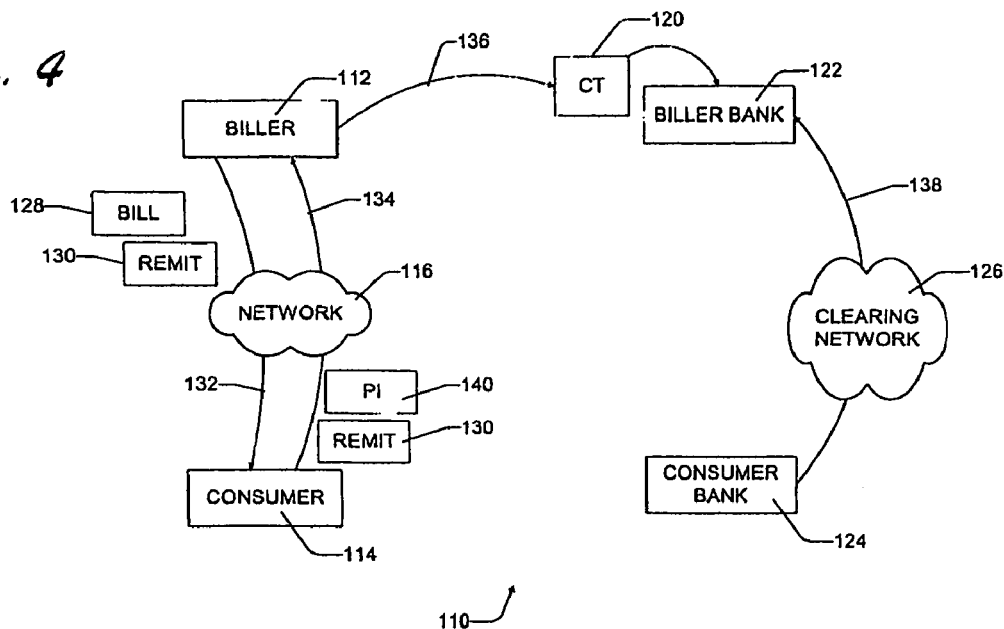
FIGS. 4, 6 and 7 are diagrammatic illustrations of bill presentment and payment systems according to implementations of this invention.

FIG. 4 shows a bill presentment and payment remittance & settlement system 110 according to an implementation of this invention. The system 110 includes a biller 112, a consumer 114, and a network 116. The bill presentment and payment system 110 is an electronic, computerized system having computing units at the biller 112 and consumer 114. For convenience, the pair of terms "biller" and "biller computing unit," as well as the pair of terms "consumer" and "consumer computing unit," will be used interchangeably. A detailed discussion of an exemplary implementation of a consumer computing unit is described below and depicted in FIG. 6.

The network 116 is an electronic data network. One preferred implementation is a public network, and particularly, the Internet. The Internet is a network formed by the cooperative interconnection of computing networks, including local and wide area networks. It interconnects computers from around the world with existing and even incompatible technologies by employing common protocols that smoothly integrate the individual and diverse components.

The bill presentment and payment system 110 includes a biller bank 122 that maintains the biller's account. In this implementation, a concentrator 120 is also illustrated to perform the lockbox operations. The lockbox functions can be performed by either the biller or a third party designated by the biller, such as the biller bank, a different bank, or another non-bank entity. The bill and presentment system 110 further includes a consumer bank 124 which manages the consumer's account. Other depository financial institutions wherein the consumer has an account, such as a brokerage firm with checking privileges, may be substituted for the consumer bank 124 within this system. The biller bank 122 and consumer bank 124 are connected to a clearing network 126, such as the ACH network.

Figure 5:
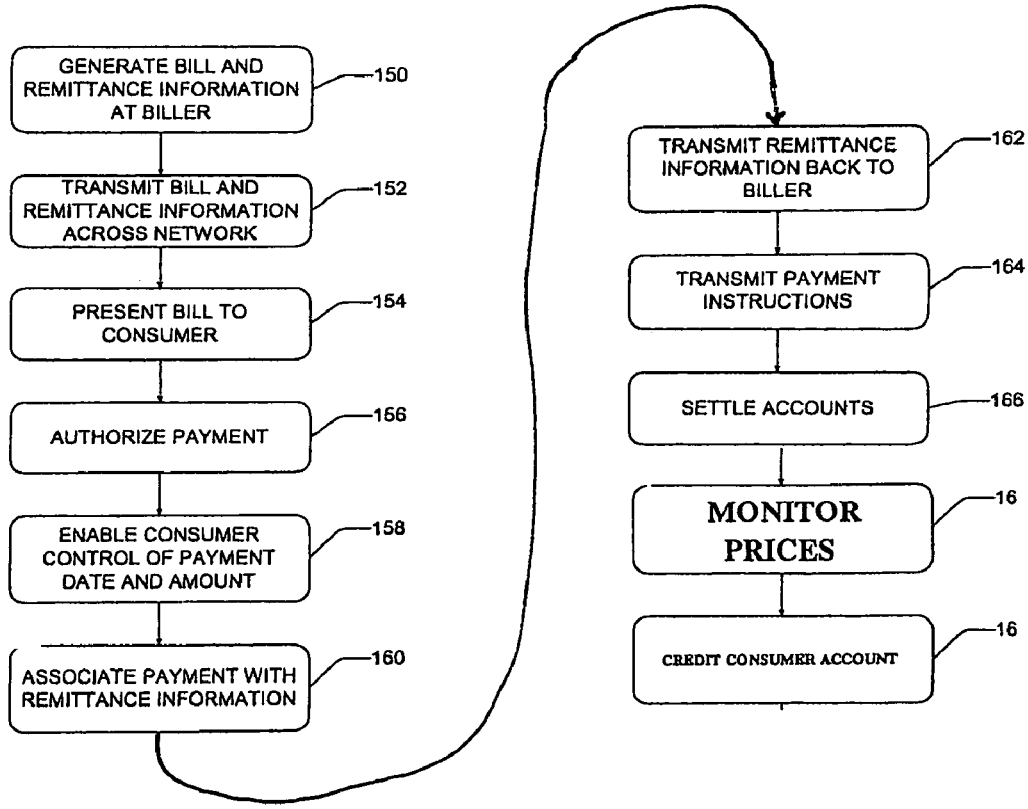
FIG. 5 is a flow diagram of a method for electronically presenting and paying bills using the FIG. 4 system.

FIG. 5 shows a method for electronically presenting and paying bills using the system 110. As one implementation, the steps are performed in software executing at the biller computing unit 112 and the consumer computing unit 114. Other software components might also reside at the biller bank 122 (and/or concentrator 120) and the consumer bank 124. At step 150, the biller's software executing at the biller computing unit 112 generates a bill 128 and associated payment remittance information 130 according to a format created entirely by the biller. This is advantageous because the biller can customize the bill and remittance information to include any type of data that it wants. Additionally, the bill and payment remittance information can be specifically formatted for compatibility with the biller's existing accounting software. Another advantage is that the bill can be artistically designed to present an appearance unique to the biller. The bill 128 might be implemented simply as a static data structure which holds pertinent data related to the account and billing matters, as well as any remittance data desired by the biller. This data structure is passed between the biller computing unit and the consumer computing unit and utilized by the software components running on these computing units. The bill 128 might alternatively be constructed with additional features, such as embedded hyperlinks, pop-up dialog boxes, or pop-up advertisements. The bill 128 might further be constructed as a sophisticated application, having executable code and other features, in addition to the basic data structure.

At step 152 in FIG. 5, the biller computing unit 112 sends the bill 128 and payment remittance information 130 across the public network 116 to the consumer computing unit 114 (as illustrated by arrow 132 in FIG. 4). The biller computing unit 112 can also include non-billing materials to the bill, such as regulatory notices, warnings, or advertisements. The biller computing unit 112 might optionally digitally sign the bill and payment remittance information before transmission. A digital signature is often used to verify the source of information on a network such as the Internet.

The consumer computing unit 114 receives the bill 128 and remittance information 130 from the network 116. In one implementation, the bill and remittance information arrive in the form of an email message or a notification for the consumer to check a billing mailbox to retrieve electronic bills. A bill presentment and payment software application residing on the consumer computing unit 114 is opened to facilitate presenting and paying the bill. This application might be opened automatically upon receipt of the bill, or in response to the consumer activating the bill email message (for example, by using a mouse to point to and double left-click on the bill message). The consumer computing unit 114 might further be configured to authenticate the biller's signature, if one is attached, to ensure that the bill is truly from the biller and not an impostor trying to covertly extract money from the consumer.

At step 167, FIG. 5, the biller computing unit 112 (or any other computing unit or suitable system in the overall system) may be used to monitor the Network 116 (or any other desired Network or database) for prices for the goods or services purchased by the consumer. The unit 112 can compute price differences and applicable refunds and can then initiate and transmit a credit, e.g. via the Network 126, which is automatically credited (step 169 (to the consumer's account, e.g. a consumer account in the consumer bank 124 (or, alternatively a consumer's credit card account or account with a company—as can be the consumer account credited in any embodiment of this invention).

With reference again to FIG. 4 and to step 162 in FIG. 5, the consumer computing unit 114 transmits the remittance information 130 directly back to the biller 112 via network 116 (as represented by arrow 134 in FIG. 4). The consumer computing unit 114 uses the biller's network address in address data field 204 of the data structure 190 to electronically route the payment remittance information 130 to the biller. Routing can be achieved in a variety of ways, including email, Internet URL addresses, and so forth. The payment remittance information is created by the biller in a particular format, and the payment remittance information 130 remains in the biller prescribed format for seamless integration to the biller's existing accounting system. Moreover, the payment remittance information is automatically returned to the biller without intervention by the consumer, except that the amount to be paid and the payment date are appended.

At step 166 in FIG. 5, the accounts for the consumer and biller are settled using the settlement subsystem of the bill presentment and payment system 110. In the FIG. 4 implementation, the biller 112 forwards the payment instructions onto the biller bank 122 (as represented by arrow 136 in FIG. 4). The biller bank 122 requests settlement with the consumer bank 124 via the clearing network 126. As an example, the biller bank 122 submits an ACH debit transaction which debits the consumer's account in consumer bank 124 for the amount of the payment authorized by the consumer (as represented by arrow 138 through clearing network 126).

Figure 6:
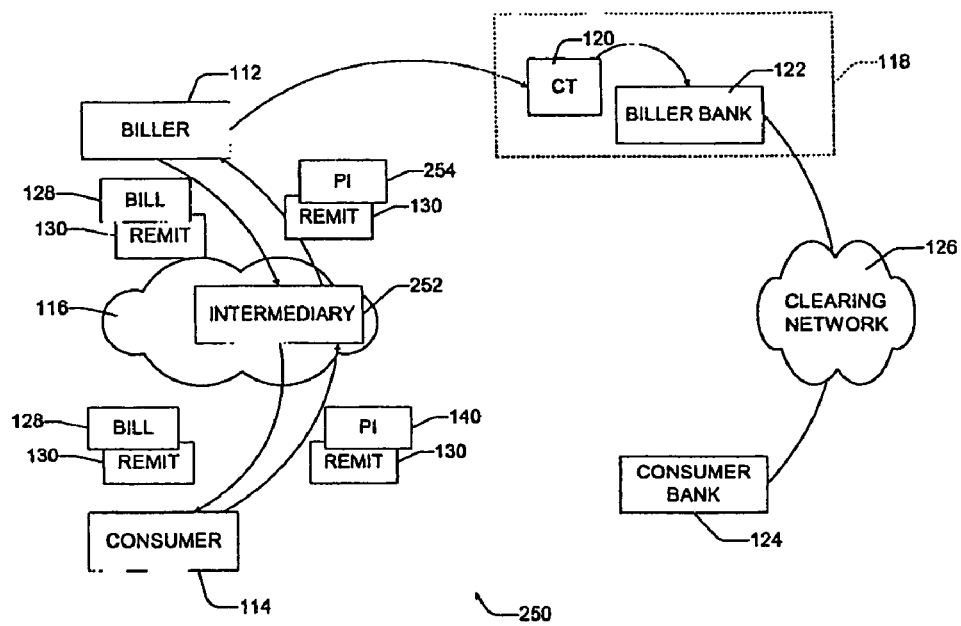

FIG. 6 shows another implementation of a bill presentment and payment system in accordance with the invention, which is referenced generally by number 250. System 250 differs from the system 110 described with respect to FIG. 4 in that an intermediary 252 is interposed between the biller 112 and consumer 114. The intermediary 252 is a bill presentment and payment remittance service provider that handles billing responsibilities for the biller and payment instructions remitted back from the consumers. The intermediary 252 acts as a centralized bill warehouse and delivery mechanism that offers one gathering place for both billers and consumers. The intermediary 252 is equipped with a computing unit that is programmed to electronically handle the bills, remittance information, payment instructions, and staging and delivery instructions on behalf of many different billers and many different consumers. The intermediary functions can also be split among multiple entities. For example, one company can stage the bills and another company can handle the remittance processing. Other arrangements for handling the intermediary functions are also possible.

The biller 112 sends bill 128 and remittance information 130 to the intermediary 252 for staging. The intermediary 252 transfers the bill and remittance information to the appropriate consumers 114 at the prescribed billing times. Alternatively, the consumer 114 can periodically access the intermediary 252 for bills in his/her name or account number. The electronic transmission is carried out over the network 116.

The consumer reviews the bill, and if acceptable, authorizes payment. In the same manner as described above, the consumer enters the payment amount and date using the payment UI, and submits the remittance information 130 and payment instructions 140 back to the intermediary 252 over the network 116. Remittance information bound for a specific biller is pooled by the intermediary 252 and sent to that biller in batch. The intermediary 252 also produces payment instructions 254 that are in a file compatible with the clearing network 126. For instance, the PI 254 might be in the form of an ACH-ready file used to settle accounts in ACH networks.

The biller 112 passes the payment instructions onto a concentrator 120 or biller bank 122. The biller bank 122 submits a debit transaction using the clearing payment instructions generated by the intermediary 252 to debit the consumer's account in consumer bank 124 for the amount of the payment authorized by the consumer. The intermediary's computing unit is programmed (as is, e.g. the biller computing unit 112, FIG. 4) to monitor prices of the goods or services purchased by the computer to calculate price differences; to validate applicable refunds; and to initiate and transmit a credit in an account of the consumer. Alternatively, any other computing unit in the system does this.

Figure 7:
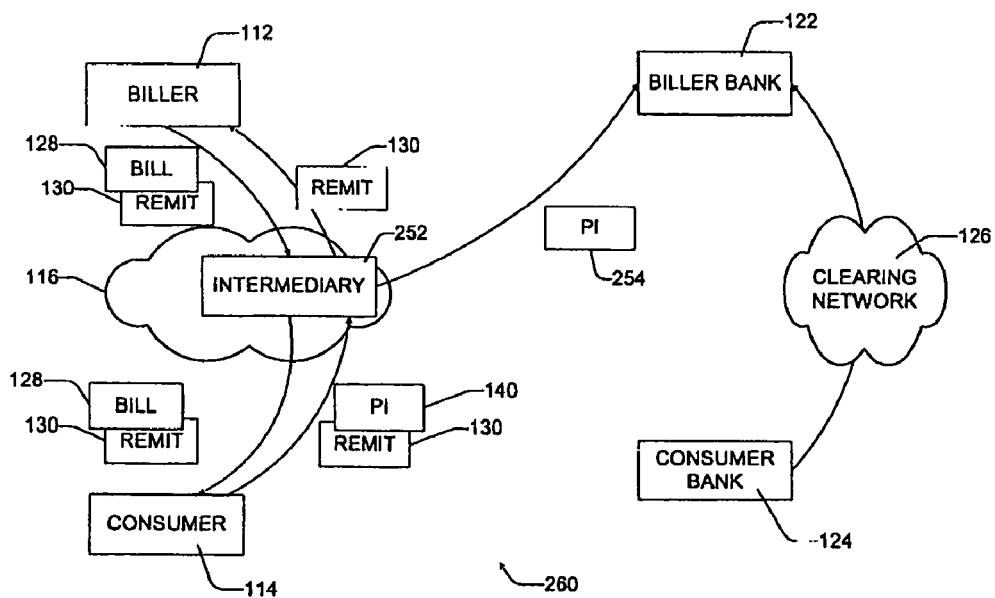

FIG. 7 shows another implementation of a bill presentment and payment system in accordance with the invention, which is referenced generally by number 260. System 260 is essentially the same as system 250 described above with respect to FIG. 6, with the primary difference being that the intermediary 252 sends the payment instructions (PI) 254 directly to the biller bank 122 as opposed to the biller 112. This eliminates having the biller handle the payment instruction file. In a variation of this implementation, the intermediary can be configured to submit the payment instructions directly, or through its own bank (not shown), to the clearing network 126.

In any system disclosed herein according to the present invention, an entity (e.g., but not limited to, a financial institution, a network, an ISP, a retail business, or an on-line entity) may have a consumer register or sign-up to receive the benefit of a best price guarantee. Such registration or sign-up may be for a predetermined, preselected period of time, e.g., a week, a month, or a year or it may be without time limit following an initial registration or sign-up. Registration or sign-up may be by phone, by mail, in person, and/or on-line. Registration or sign-up may be free; there may be a one-time charge or fee; there may be periodic charges or fees; there may be a charge or fee each time a transaction is entered into or until a pre-set number of transactions are completed; and/or there may be a charge or fee based on a percentage of the monetary sales amount for a transaction, with or without a cap or upper limit beyond which there are no more charges or fees.

In certain embodiments, the present invention provides improvements to the subject matter of U.S. Pat. No. 6,760,711 B1 issued on Jul. 6, 2004 (which is incorporated herein fully for all purposes). In certain aspects, a system according to the present invention includes an online commerce architecture that enables merchants to setup online stores that are hosted by third party Internet service providers (ISPs) and which provide price guarantee protection to a consumer—either automatically or as opted for by the consumer either at the time of purchase or within some specified time period after the purchase is consummated. The architecture provides secure storage of the merchant's commerce information at the ISP-hosted database. The online commerce system, in certain aspects, includes a merchant computer resident at a merchant and a server computer resident at the ISP. The merchant registers with the ISP to have the ISP host the merchant's online storefront. During an installation process, Web pages forming the online store are created and stored at the ISP computer. Either the ISP computer or the merchant computer or both are programmed and configured to provide a consumer price guarantee [as any price guarantee method described herein according to the present invention and as any computer-readable medium for providing such a guarantee described herein and with any apparatus for providing such a guarantee herein—either automatically or as opted for by the consumer). The merchant, the ISP, or both may offer a price guarantee as any described herein. A commerce Web server is run on the ISP-hosted computer. The ISP computer also hosts or runs a session key generator and an order encryption unit.

The merchant computer has a key generator and an order decryption unit. As part of the installation process, the merchant's key generator creates a pair of private and public keys associated with the merchant. The merchant's private key is retained at the merchant computer, while the merchant's public key is passed to the service provider computer and stored in a directory associated with the merchant's online store.

When a customer orders a product from the online store, the customer submits a purchase request containing product information; sensitive commerce data (e.g., credit card information); and, if the price guarantee protection is not automatic, a selection of the price guarantee offered by the merchant and/or by the ISP. The commerce server hosted at the ISP receives the purchase request and generates a session key via the session key generator. The ISP order encryption unit encrypts part or all of the purchase request using the session key, and then encrypts the session key using the merchant's public key. The ISP stores the purchase request and session key in their encrypted form. In this manner, if illegal access to the IPS's machine is obtained, the stored sensitive data is protected because it is stored in an encrypted format and the private key needed to access the data is on the merchant's machine.

The merchant computer routinely accesses the ISP and downloads any purchase requests in their encrypted form. At the merchant, the merchant's order decryption unit decrypts the session key using the merchant's private key and subsequently decrypts the purchase request using the decrypted session key.

In situations in which the price guarantee is not automatic, either the merchant computer or the ISP computer can be programmed and configured to produce a notice to the merchant, to the ISP, and/or to the consumer at the point of sale and/or at a location remote from the point of sale following the consummation of the purchase, the notice informing the merchant, the ISP, and/or the consumer that price guarantee protection is available if the consumer so chooses. The notice may be by email, by regular mail or messenger, and/or by phone.

Figure 13:
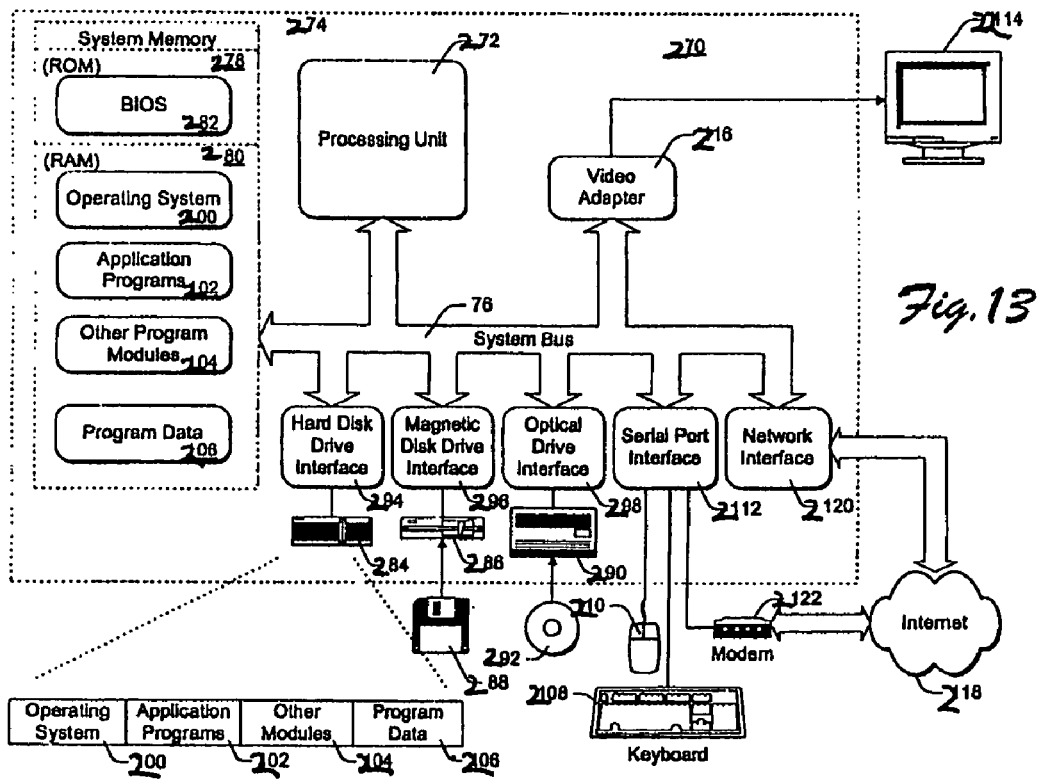

FIG. 13 shows an online commerce system 220 in which customers shop for goods and/or services offered by merchants over the Internet 222. The merchants have their own computer systems, as represented by computers 224(1), 224 (2), . . . 224(N). The merchant computers are coupled to an Internet service provider computer system 226 via a network 228, which may also be the Internet, but alternatively may be a wide area network, a telephone network, cable network, or other connection. The merchants computers 224(1)-224(N), with the assistance of the ISP computer 228, create online stores that are merchant-owned, but physically hosted by the ISP computer 228. The ISP computer 228 is loaded with commerce server software 230 that allows the ISP to host online stores on behalf of the merchants. As one exemplary implementation, the commerce server 230 is the Site Server Commerce Edition software that is an add on to the Internet Information Services (IIS) software package designed to run on the Windows NT operating system, all of which are available from Microsoft Corporation. The commerce server includes a store builder module that helps a merchant set up an online storefront. The store builder module includes a store builder wizard that steps a merchant through a series of questions to extract information pertaining to the merchant's business and a page generator to produce Web pages based on the merchant-supplied information to form the online storefront.

Figure 12:
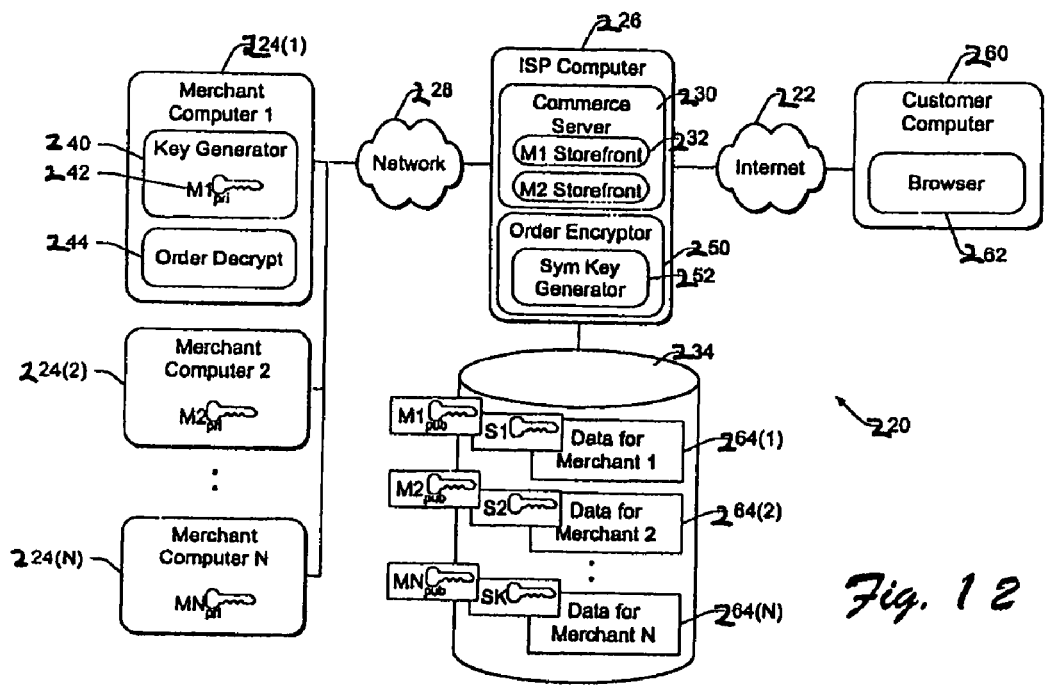
FIG. 12 shows an online commerce system for use with methods according to the present invention.

The merchant uses a local Web browser (not shown) to remotely access the commerce server, and namely the store builder wizard, on the ISP computer 226. The wizard steps the merchant through several screens to gather product and pricing information, shipping preferences, payment methods, and so forth. Based on the merchant provided information, the ISP-based commerce server 230 creates the merchant's storefront 232 that is kept resident at the ISP computer. In FIG. 12, storefronts for merchants 1 and 2 are shown hosted at the ISP 226. The ISP also has a storage or database 234 that stores commerce data on behalf of the merchants. For simplified stores, the data is stored in a file in storage 234. The commerce data is received from customers as a result of the customers placing orders for goods and services offered on the merchants' online stores 232.

As part of storefront building process, the merchant computer 224 is loaded with software tools to assist in creating the online store. The tools are either loaded locally from a disk or downloaded from the ISP computer 226. A first software tool is an asymmetric key generator 240 that is used to generate an asymmetric key pair unique to the merchant and associated with the merchant's storefront 232. The key pair includes a private key and a public key, which will be used to protect and access merchant-owned commerce data stored at the ISP storage 234. The key generator 240 installs the private key at the merchant computer, as represented by key 242 (M1.sub.pri) on merchant computer 224(1). Different private keys M2.sub.pri, . . . MN.sub.pri are created and installed at merchant computers 224(2), . . . 224(N), as a result of various merchants' store building processes. The key generator 240 passes the corresponding public key M1.sub.pub to the ISP computer 226 for use in protecting commerce data to be stored on behalf of the merchant.

A second software tool is an order decryptor 244 that is capable of performing decryption functions. The order decryptor 244 employs both asymmetric and symmetric cryptography to decrypt messages using either asymmetric keys or symmetric keys. As one example, the order decrypt 244 may be implemented as a cryptographic API (Application Program Interface) exposed in Windows-brand operating systems, such as the Windows NT operating system. The cryptographic API ("CAPI" or "CryptoAPI") is described in U.S. Pat. No. 5,689,565, entitled "Cryptography System and Method for Providing Cryptographic Services for a Computer Application", which is assigned to Microsoft Corporation. This patent is hereby incorporated by reference. An "asymmetric" key algorithm involves two separate keys that are based upon a mathematical relationship in which one key cannot be calculated from the other key. Encryption and decryption using an asymmetric key pair can be represented as follows:

Asym.E.sub.Kpri (M)=M.enc

Asym.D.sub.Kpub (M.enc)=M where "Asym.E.sub.Kpri" is an encryption function using a private key "Kpri," "M" is a message, "M.enc" is an encrypted version of the plaintext message, and "Asym.D.sub.Kpub" is a decryption function using the public key "Kpub". The inverse is also true in that a message can be encrypted using the public key and then decrypted using the private key. In a public key system, as is the case here, the public key M1.sub.pub is distributed to other parties, such as the ISP, and the private key M1.sub.pri is maintained in confidence. The asymmetric public and private keys ensures that only the holder of the private key (i.e., the merchant) can decrypt a message that is encrypted with the corresponding public key. An example asymmetric algorithm is the well-known RSA cryptographic algorithm named for the creators Rivest, Shamir, and Adleman. The order decryptor 244 also handles symmetric ciphers. In a "symmetric" cipher, the encryption key can be calculated from the decryption key, and vice versa. In many cases, the encryption key and the decryption key are the same. Once the symmetric key is divulged, any party can encrypt or decrypt messages. Example symmetric ciphers are a DES (Data Encryption Standard) encryption algorithm or an RC4 algorithm.

An optional third software tool loaded in the merchant computer provides a price guarantee generator 243 ("PGP") for automatic price guarantee protection for the consumer consummating a purchase with the system; or this software tool queries the consumer at the time of purchase to see if the consumer wants a price protection guarantee, and, if opted for by the consumer, provides for storing of the option as exercised in the merchant computer, in the consumer's computer, and/or in the ISP computer. Alternatively, such a software tool is loaded in the ISP computer or a consumer's computer.

The ISP computer 226 is equipped with an order encryptor 250 that is capable of performing both asymmetric and symmetric encryption functions. The order encryptor 250 includes a symmetric key generator 252 that generates symmetric session keys, such as DES keys, that are used to encrypt and decrypt merchant-owned data stored on the storage 234. The symmetric key generator 252 generates a new session key for each purchase order received from a customer. The order encryptor 50 encrypts the order using a newly generated session key, and then encrypts that key using the merchant's public key. As one exemplary implementation, the order encryptor 250 is built into a server pipeline component of the Site Server Commerce Edition manufactured and sold by Microsoft Corporation. The pipeline component calls a COM object that provides high-level cryptographic functions, which in turn calls the CryptoAPI layer. The strength of the encryption can vary as desired or permitted for export, from exportable encryption to higher non-exportable encryption.

A customer computer 260 facilitates customer access to the Internet 222. The customer computer 260 is equipped with a browser 262 that enables the customer to access and browse the storefront 232 hosted by the commerce server 230 at the ISP computer 226. When the browser 262 hits the Web site, the commerce server 230 serves one or more Web pages over the Internet 222 to the customer computer 260. Individual Web pages are typically configured as a hypertext document, such as an HTML document, which can be rendered by the browser 262 on the customer computer 260. The rendered pages create a store experience and provide product and pricing information.

As an alternative to static Web pages, the Web pages forming the storefront may be configured as an "active server page", or "ASP". An ASP is written in a combination of a hypertext language (e.g., HTML) and a scripting language, such as Visual Basic Script (or "VBS") or J Script from Microsoft Corporation, perl, python, REXX, or tcl. When the customer browser 262 requests an ASP, the scripting language is executed to produce a Web page in the form of a hypertext document that can be rendered by the browser. Active Server Pages are described in documentation available from Microsoft's Web site under the section Internet Information Services.

Exemplary Computer

FIG. 13 shows an exemplary implementation of a computer, such as the merchant computer 224, the ISP computer 226, or the customer computer 260. The host computer is a general purpose computing device in the form of a conventional personal computer 270 that is configured to operate as a network server (in the case of the merchant and ISP computers) or as a client computer (in the case of the customer computer). The server computer 270 includes a processing unit 272, a system memory 274, and a system bus 276 that couples various system components including the system memory 274 to the processing unit 272. The system bus 276 may be any of several types of bus structures including a memory bus or memory controller, a peripheral bus, and a local bus using any of a variety of bus architectures. The system memory 274 includes read only memory (ROM) 278 and random access memory (RAM) 280. A basic input/output system 282 (BIOS) is stored in ROM 278. The server computer 270 also has one or more of the following drives: a hard disk drive 284 for reading from and writing to a hard disk, a magnetic disk drive 286 for reading from or writing to a removable magnetic disk 288, and an optical disk drive 290 for reading from or writing to a removable optical disk 292 such as a CD ROM or other optical media. The hard disk drive 284, magnetic disk drive 286, and optical disk drive 290 are connected to the system bus 276 by a hard disk drive interface 294, a magnetic disk drive interface 296, and an optical drive interface 298, respectively. The drives and their associated computer-readable media provide nonvolatile storage of computer readable instructions, data structures, program modules and other data for the personal computer. Although a hard disk, a removable magnetic disk and a removable optical disk are described, other types of computer readable media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 200, one or more application programs 202, other program modules 204, and program data 206. When implemented in the context of the ISP computer, the programs 202 or modules 204 include the commerce server 230, order encryptor 250, and database software or file management software to manage the merchant-owned data on the database or storage 234 and the software for providing price guarantee protection 243. When implemented in the context of the merchant computer, the programs 202 or modules 204 include the key generator 240, and optionally the price guarantee protection generator 243, and the order decryptor 244.

A user may enter commands and information into the personal computer 270 through input devices such as keyboard 208 and pointing device 210. Other input devices (not shown) may include a microphone, joystick, game pad, satellite dish, scanner, or the like. These and other input devices are often connected to the processing unit 272 through a serial port interface 212 that is coupled to the system bus 276, but may be connected by other interfaces, such as a parallel port, game port, or a universal serial bus (USB). A monitor 214 or other type of display device is also connected to the system bus 276 via an interface, such as a video adapter 216. In addition to the monitor, personal computers typically include other peripheral output devices (not shown) such as speakers and printers.

The server computer 270 is connected to a network 218 (e.g., network 228 or Internet 222) through a network interface or adapter 220, a modem 222, or other means for establishing communications over the network. The modem 222, which may be internal or external, is connected to the system bus 276 via the serial port interface 212.

Operation

The online commerce architecture enables the merchants to setup their online stores at the ISP computer 226, and have the ISP temporarily receive and hold purchase requests placed by the customers and price protection guarantees (either automatic or opted for by the customer). In general, there are three phases to establishing and operating the architecture: (1) an installation phase, (2) a purchase phase, and (3) a purchase review phase. These phases are described separately below with respect to the steps illustrated in FIGS. 14-16, and to the architecture of FIG. 12.

Phase 1: Installation

FIG. 14 shows steps in a method for installing a merchant-owned storefront 232 at the ISP computer 226. These steps are computer-implemented steps resulting from execution of program code at the merchant computer 224(1) and the ISP computer 226. At step 250, the merchant computer 224(1) initiates creation of the M1 storefront 232 at the ISP computer 226. The merchant sets up an account for the ISP computer to host the merchant's online storefront 232 for Internet shoppers. In one exemplary implementation, the merchant can use a Web browser to invoke a store builder wizard supported by the commerce server 230. The merchant enters product information and answers a series of high-level questions pertaining to the merchant's business. Based on the entered information, the ISP-based commerce server 230 creates the merchant's storefront 232. This approach to creating an online storefront is described in U.S. patent application Ser. No. 08/970,217, entitled "Automated Web Site Creation Using Template Driven Generation Of Active Server Page Applications." This application was filed Nov. 14, 1997 in the name of Michael A. Cohen. This application is assigned to Microsoft Corporation and is incorporated by reference. As part of the storefront creation, the merchant computer 224(1) downloads the key generator program 40 and the order decryptor utility 244, and, optionally, the price guarantee generator 243, from the ISP computer 226. The merchant computer 224(1) runs the key generator program 240 near the end of the store builder wizard to generate a unique key pair (step 252). The merchant computer installs the private key M1.sub.pri locally in a registry for the user that is currently logged in and running the wizard. The merchant computer places the public key M1.sub.pub in a binary file and passes it over the network 228 to the ISP computer 226. The ISP computer stores the public key M1.sub.pub in a file system or system registry that manages the merchant's online store (step 254).

Phase 2: Purchase

When the customer decides to order a product or service, it submits a purchase request over the Internet 222 to the ISP computer 226. The purchase request may be passed over a secure path established between the ISP computer 226 and customer computer 260. As an example, computers running a Windows-brand operating system may establish an SSL (secure socket layer) connection that protects messages through cryptography that are being passed over an otherwise public and open network, such as Internet 222. The purchase request may include the customers opting for the price protection guarantee and agreeing to the terms thereof; or any computer in the system can automatically provide price the protection guarantee upon consummation of the purchase.

FIG. 15 shows steps in a method for handling a purchase request received from the customer computer 260 at the ISP computer 226. The steps are computer-implemented steps resulting from execution of program code at the ISP computer 226. At step 260, the ISP computer 226 receives the purchase request from the customer computer 260 via the Internet 222. The purchase request includes general information pertaining to the goods or services, such as a product ID, a customer ID, a quantity, a date, a payment method, option for price guarantee protection (or an automatic guarantee) and so forth. The purchase request might also include some commerce sensitive data, such as credit card information. The ISP computer 224 eventually saves the purchase requests in files in conjunction with the merchant, so that merchants can access and download their purchase requests when desired. In FIG. 12, the commerce server software 230 stores purchase data received on behalf of merchants 224(1)-224(N) in separate storage files, as represented by data 264(1) for merchant 1, data 264(2) for merchant 2, and data 64(N) for merchant N. These files are illustrated as being stored in database or storage 234. Each purchase request is a data structure made up of different fields to hold various types of information. Since the purchase request contains sensitive data, such as credit card information, the order encryptor 250 is invoked to encrypt the entire data structure or the fields holding the sensitive information prior to storage in a file.

At step 262, the symmetric key generator 252 executing at the ISP computer creates a symmetric key used to encrypt a particular purchase request. For example, suppose that the key generator 252 generates a session key S1 to encrypt a purchase request received for merchant 1. At step 264, the order encryptor 250 encrypts all or part of the purchase request (PR) using the session key S1, as follows:

Sym.E.sub.s1 (PR)=PR.enc where "Sym.E.sub.s1" is a symmetric encryption function using a session key "S1" and "PR.enc" is an encrypted version of the purchase request.

At this point, the ISP computer 226 has encrypted the purchase request, but the session key to decrypt the request remains on the ISP server. To prevent the ISP operators or others who have access to the ISP server from accessing the merchant's data, the ISP order encryptor 250 also encrypts the session key S1 using the merchant's public key M1.sub.pub that is stored at the ISP computer (step 166). This is represented as follows:

Asym.E.sub.M1pub (S1)=S1.enc where "Asym.E.sub.M1pub" is an asymmetric encryption function using the merchant's public key "M1.sub.pub" and "S1.enc" is an encrypted version of the session key. Since only the merchant knows the corresponding private key M1.sub.pri, only the merchant computer 224(1) can decrypt the session key to decrypt the purchase request.

The ISP computer 226 stores the encrypted purchase request and encrypted session key on the database 254 (step 268). This is represented in FIG. 12 by the purchase data 264(1), 264(2), ... , 264(N) being encrypted using associated and uniquely generated session keys S1, S2, ... , SK, with those session keys themselves being encrypted using corresponding merchant public keys M1.sub.pub, M2.sub.pub, and MN.sub.pub.

Phase 3: Review

FIG. 16 shows steps in a method for retrieving and reviewing purchase requests stored at the ISP computer 226 on behalf of the merchants. The steps are computer-implemented steps resulting from execution of program code at the merchant computer 224(1). Periodically, or in response to a merchant-initiated request, the merchant computer 224(1) checks the ISP database 234 to see if any purchase requests for the merchant's products have been received. If so, the merchant computer 224(1) downloads the one or more purchase requests stored at the ISP computer 226 (step 270). The merchant computer 224(1) may use a browser to access and retrieve the data. In one implementation, when the browser detects an order download, an order management application is launched locally on the merchant computer 224(1). The application retrieves the private key M1.sub.pri and passes it to the order decryptor. At step 272, the order decryptor 242 decrypts the session key S1 using the merchant's private key M1.sub.pi, as follows:

Asym.D.sub.M1pri (S1.enc)=S1 where "Asym.D.sub.M1pri" is an asymmetric decryption function using the merchant's private key "M1.sub.pri". Only the merchant with knowledge of the private key M1.sub.pri can decrypt the session key. At step 274, the order decryptor 242 decrypts the encrypted portion(s) of the purchase request using the session key S1, as follows:

Sym.D.sub.s1 (PR.enc)=PR where "Sym.D.sub.s1" is a symmetric decryption function using a session key "S1". Once decrypted, the merchant can review the purchase request and respond as appropriately to the customer (step 276). It is noted that the customer receives immediate confirmation of his/her order and is not required to patiently wait for a response from the merchant. On occasions, the merchant may not review the orders for several hours or several days, and hence the customer is not required to wait for a response. A price guarantee is handled as is any price guarantee in any system described herein.

The present invention, therefore, in at least some, but not necessarily all embodiments, provides a method for guaranteeing a consumer a best price on an item purchased from a vendor in a consummated final first transaction at a first price, the method including: recording the first price and information identifying the consumer; monitoring the sales price of the item for a predetermined time period after purchase of the item by the consumer in the consummated final first transaction; noting any price lower than the first price for the item during the predetermined time period following the purchase of the item; calculating a money-value difference between the first price and said any price lower than the first price; and refunding to the consumer a refund amount equal to the money-value difference; wherein the item is purchased via a host system and the host system records the first price and information identifying the customer; the host system conducts the monitoring, noting, and calculating steps; and the host system provides the refund to the consumer; wherein the host system provides the refund by crediting an account of the consumer; and displaying the refund amount. Such a method may have one or some (in any possible combination) of the following: wherein the item is purchased by the consumer at a location of the vendor; wherein the item is purchased by the consumer on-line via a network system; wherein the account is an account of the consumer with the host system; wherein said displaying is an individual private display to the consumer; wherein the individual display is via email; wherein only prices for the item to be sold by the vendor involved in the first transaction are taken into account in the noting step; wherein only prices for the item for sale in a pertinent geographic area are taken into account in the noting step; and/or wherein said displaying is a public display.

The present invention, therefore, in at least some, but not necessarily all embodiments, provides a method for a vendor to publicize a total money amount of refunds provided to consumers, the method including: totalling a money amount of a plurality of refunds made to consumers by the vendor producing a totalled money amount; displaying the totalled money amount; each refund of said plurality of refunds determined by a guarantee method for guaranteeing a consumer a best price on an item purchased from a vendor in a consummated final first transaction at a first price, the guarantee method including recording the first price and information identifying the consumer, monitoring the sales price of the item for a predetermined time period after purchase of the item by the consumer in the consummated final first transaction, noting any price lower than the first price for the item during the predetermined time period following the purchase of the item, calculating a money-value difference between the first price and said any price lower than the first price, and refunding to the consumer a refund amount equal to the money-value difference, and, optionally, wherein the item is purchased via a host system and the host system records the first price and information identifying the customer; the host system conducts the monitoring, noting, and calculating steps; and the host system provides the refund to the consumer, and, optionally, wherein the host system provides the refund by crediting an account of the consumer, in one aspect, automatically crediting the account. Such a method may have one or some (in any possible combination) of the following: wherein said displaying is an individual private display to the consumer; wherein the individual display is via email; wherein said displaying is via email to a plurality of entities; and wherein said displaying is via email to the consumers.

In conclusion, therefore, it is seen that the present invention and the embodiments disclosed herein and those covered by the appended claims are well adapted to carry out the objectives and obtain the ends set forth.

What is claimed is:

1. A method for guaranteeing a consumer a best price on an item purchased from a vendor in a consummated final first transaction at a first price, the method comprising:

recording the first price and information identifying the consumer;

monitoring a sales price of the item for a predetermined time period after purchase of the item by the consumer in the consummated final first transaction;

noting any price lower than the first price for the item during the predetermined time period following the purchase of the item;

calculating a money-value difference between the first price and said any price lower than the first price; and refunding to the consumer a refund amount equal to the money-value difference, wherein the item is purchased via a host system and the host system records the first price and information identifying the customer; the host system conducts the monitoring, noting, and calculating steps; and the host system provides the refund to the consumer, wherein the host system provides the refund by crediting an account of the consumer, wherein only prices for the item to be sold by the vendor involved in the first transaction are taken into account in the noting step; and displaying the refund amount.

2. The method of claim 1 wherein the item is purchased by the consumer at a location of the vendor.

3. The method of claim 1 wherein the item is purchased by the consumer on-line via a network system.

4. The method of claim 1 wherein the account is an account of the consumer with the host system.

5. The method of claim 1 wherein said displaying is an individual private display to the consumer.

6. The method of claim 5 wherein the individual display is via email.

7. The method of claim 1 wherein only prices for the item for sale in a pertinent geographic area are taken into account in the noting step.

8. The method of claim 1 wherein said displaying is a public display.

9. A method for a vendor to publicize a total money amount of refunds provided to consumers, the method comprising:
totaling a money amount of a plurality of refunds made to consumers by the vendor producing a totaled money amount;
displaying the totaled money amount in an advertisement;
each refund of said plurality of refunds determined by a guarantee method for guaranteeing a consumer a best price on an item purchased from a vendor in a consummated final first transaction at a first price, the guarantee method comprising:
recording the first price and information identifying the consumer;
monitoring the sales price of the item for a predetermined time period after purchase of the item by the consumer in the consummated final first transaction;
noting any price lower than the first price for the item during the predetermined time period following the purchase of the item;
calculating a money-value difference between the first price and said any price lower than the first price; and
refunding to the consumer a refund amount equal to the money-value difference,
wherein the item is purchased via a host system and the host system records the first price and information identifying the customer; the host system conducts the monitoring, noting, and calculating steps; and the host system provides the refund to the consumer,
wherein the host system provides the refund by crediting an account of the consumer, and
wherein only prices for the item to be sold by the vendor involved in the first transaction are taken into account in the noting step.

10. The method of claim 9 wherein said displaying is an individual private display to the consumer.

11. The method of claim 10 wherein the individual private display is via email.

12. The method of claim 9 wherein said displaying is via email to a plurality of entities.

13. The method of claim 9 wherein said displaying is via email to the consumers.

14. An apparatus for guaranteeing a price comprising:
a host system configured to:
receive a first price of an item and information identifying a consumer associated with a consummated final first transaction with a vendor;
monitor a sales price of the item for a predetermined time period after the consummated final first transaction;
record at least one lower price during the predetermined time period, wherein the lower price is lower than the first price, and wherein only prices for the item to be sold by the vendor involved in the first transaction are taken into account;
calculate a money-value difference between the first price and the lower price;
refund to the consumer a refund amount equal to the money-value difference by crediting an account of the consumer; and
display the refund amount.

15. A system for guaranteeing a price comprising:
means for receiving a first price of an item and information identifying a consumer associated with a consummated final first transaction with a vendor;
means for monitoring a sales price of the item for a predetermined time period after the consummated final first transaction;
means for recording at least one lower price during the predetermined time period, wherein the lower price is lower than the first price, and wherein only prices for the item to be sold by the vendor involved in the first transaction are taken into account;
means for calculating a money-value difference between the first price and the lower price;
means for refunding to the consumer a refund amount equal to the money-value difference by crediting an account of the consumer; and
means for displaying the refund amount.

16. A computer-readable medium having stored thereon computer executable instructions that, if executed by a host system, cause the host system to perform a method comprising:
receiving a first price of an item and information identifying a consumer associated with a consummated final first transaction with a vendor;
monitoring a sales price of the item for a predetermined time period after the consummated final first transaction;
recording at least one lower price during the predetermined time period, wherein the lower price is lower than the first price, and wherein only prices for the item to be sold by the vendor involved in the first transaction are taken into account;
calculating a money-value difference between the first price and the lower price;
refunding to the consumer a refund amount equal to the money-value difference by crediting an account of the consumer; and
displaying the refund amount.

17. The computer-readable medium of claim 16, wherein displaying the refund amount comprises displaying an advertisement.

18. A method for guaranteeing a price comprising:
receiving, at a commerce server, a first price of an item and information identifying a consumer associated with a consummated final first transaction with a vendor from a merchant computer;
monitoring, at the commerce server, a sales price of the item for a predetermined time period after the consummated final first transaction;
recording, at the commerce server, at least one lower price during the predetermined time period, wherein the lower price is lower than the first price, and wherein only prices for the item to be sold by the vendor involved in the first transaction are taken into account;
calculating, at the commerce server, a money-value difference between the first price and the lower price;
issuing, via the commerce server, a refund amount equal to the money-value difference by crediting an account of the consumer; and
providing, via the commerce server, the refund amount to a customer computer for display.

19. The method of claim 18, wherein providing the refund amount to a customer computer for display comprises providing an advertisement.

20. The method of claim 18, wherein the item is purchased by the consumer on-line via a network system.

* * * * *